United States Patent
Clark et al.

(10) Patent No.: US 10,230,545 B2
(45) Date of Patent: Mar. 12, 2019

(54) METHOD, SYSTEM AND APPARATUS FOR LOGGING INTO A COMMUNICATION CLIENT

(75) Inventors: David William Clark, Carp (CA); Jonathan Allan Arsenault, Orleans (CA); Jeffrey William Dawson, Stittsville (CA); Eric John Wolf, Stittsville (CA)

(73) Assignee: BELL INC., Verdun (CA)

( * ) Notice: Subject to any disclaimer, the term of this patent is extended or adjusted under 35 U.S.C. 154(b) by 0 days.

(21) Appl. No.: 12/516,686

(22) PCT Filed: Nov. 30, 2006

(86) PCT No.: PCT/CA2006/001943
§ 371 (c)(1),
(2), (4) Date: May 28, 2009

(87) PCT Pub. No.: WO2008/064450
PCT Pub. Date: Jun. 5, 2008

(65) Prior Publication Data
US 2010/0070525 A1    Mar. 18, 2010

(51) Int. Cl.
*G06F 17/30*    (2006.01)
*H04L 12/66*    (2006.01)
*H04L 12/28*    (2006.01)
*H04L 29/12*    (2006.01)
*H04L 29/08*    (2006.01)

(52) U.S. Cl.
CPC .......... *H04L 12/66* (2013.01); *H04L 12/2869* (2013.01); *H04L 12/2876* (2013.01); *H04L 29/12094* (2013.01); *H04L 29/12122* (2013.01); *H04L 61/1529* (2013.01); *H04L 61/1547* (2013.01); *H04L 67/306* (2013.01)

(58) Field of Classification Search
CPC .................................................. G06F 17/30132
USPC .................... 707/769, 999.01; 709/227, 204; 455/445; 370/352; 705/78; 713/168
See application file for complete search history.

(56) References Cited

U.S. PATENT DOCUMENTS

| | | | |
|---|---|---|---|
| 5,544,237 A * | 8/1996 | Bales et al. ............... | 379/205.01 |
| 5,963,864 A * | 10/1999 | O'Neil et al. ................ | 455/445 |
| 6,980,526 B2 | 12/2005 | Jang et al. | |
| 8,234,335 B1 * | 7/2012 | Haldar et al. ................ | 709/204 |
| 2005/0091539 A1 * | 4/2005 | Wang ...................... | G06F 21/31 |
| | | | 726/4 |
| 2005/0177732 A1 * | 8/2005 | Flom ..................... | H04L 12/581 |
| | | | 713/182 |

(Continued)

FOREIGN PATENT DOCUMENTS

| | | | | |
|---|---|---|---|---|
| WO | WO 94/29986 | * | 12/1994 | ............. H04L 12/28 |
| WO | WO-1995012856 A1 | * | 5/1995 | ............. G06F 17/60 |
| WO | PCT/CA2006/001943 | | 10/2007 | |

*Primary Examiner* — Etienne P Leroux

(57) ABSTRACT

According to embodiments of the present invention, there is provided a method, system and apparatus for logging into a communication client. The method comprises receiving a registration request from a first communication client, the first communication client being registered in association with a device group. The method further comprises, responsive to a determination that there does exist a second communication client registered in association with the device group, provisioning the first communication client and the second communication client according to the registration request.

34 Claims, 8 Drawing Sheets

(56) References Cited

U.S. PATENT DOCUMENTS

| | | | |
|---|---|---|---|
| 2006/0031683 A1 | 2/2006 | Marion et al. | |
| 2006/0098624 A1* | 5/2006 | Morgan | H04L 29/06027 370/352 |
| 2006/0107295 A1* | 5/2006 | Margis et al. | 725/81 |
| 2006/0120355 A1* | 6/2006 | Zreiq | H04L 29/06027 370/352 |
| 2006/0155998 A1* | 7/2006 | Dalton, Jr. | H04L 29/06027 713/172 |
| 2006/0167997 A1* | 7/2006 | Forstadius | G06F 17/30194 709/204 |
| 2006/0206560 A1* | 9/2006 | Kanada | 709/201 |
| 2006/0229998 A1* | 10/2006 | Harrison et al. | 705/78 |
| 2006/0242408 A1* | 10/2006 | McGrew et al. | 713/168 |
| 2007/0058608 A1* | 3/2007 | Lin | 370/352 |
| 2007/0226295 A1* | 9/2007 | Haruna et al. | 709/204 |
| 2008/0117839 A1* | 5/2008 | Raju | H04L 12/1813 370/261 |

* cited by examiner

METHOD, SYSTEM AND APPARATUS FOR LOGGING INTO A COMMUNICATION CLIENT

FIELD OF THE INVENTION

This invention relates to the field of telecommunications in general and, more specifically, to a method, system and apparatus for logging into a communication client.

BACKGROUND OF THE INVENTION

With the advent of the Internet, society has witnessed the expansion of a global packet-switched network into an ever-increasing number of homes and businesses. This has enabled an ever-increasing number of users to communicate with each other, primarily utilizing electronic communications, such as e-mail and instant messaging. Meanwhile, advances have been made in delivering voice communication over packet-switched networks, driven primarily by the cost advantage of placing long-distance calls over the packet-switched networks, but also by the ability to deliver advanced service features to users. This cost advantage can be enjoyed by both a service provider delivering the voice communication over the packet-switched network service (in a form of lower operating cost), as well as the user who subscribes to the services of such a service provider (in a form of lower service subscription fees). Technology dealing with the delivery of real-time voice communication over the packet-switched network is generally referred to as voice-over-packet, voice-over-IP or, simply, VoIP.

As is well appreciated in the art, the delivery technology for VoIP-based systems is fundamentally different from the delivery technology for the traditional PSTN-based systems. This is true not only for the underlining technology, but also for the user experience. For example, in the VOIP-based systems, a user has to "log into" a communication client (ex. a VoIP phone or a soft client executed on a computing apparatus) before being able to make or receive calls. Typically, the user has to input a user name and a password into the communication client. The communication client then establishes a connection with a soft switch and logs into the telephony service using the user name and the password.

Another peculiarity associated with VoIP-based systems is that connections are established in a point-to-point fashion. Accordingly, the user has to log into each of the communication points, which the user is desirous of potentially using to make outgoing calls or to receive incoming calls. If a particular dwelling, be it a house or a business, has multiple communication clients installed thereat and the user is desirous of potentially using all of these communication clients to make and receive calls, the user would have to log into each of the multiple communication clients. Potentially, the user would need to log out of some or all of the multiple communication clients at some point in time thereafter. There is currently no means in the art to simplify the log in process for the user.

SUMMARY OF THE INVENTION

According to a first broad aspect of the present invention, there is provided a

According to the first broad aspect of the present invention, there is provided a method. The method comprises receiving a registration request from a first communication client, the first communication client being registered in association with a device group. The method further comprises, responsive to a determination that there does exist a second communication client registered in association with the device group, provisioning the first communication client and the second communication client according to the registration request.

According to the second broad aspect of the present invention, there is provided an apparatus. The apparatus comprises means for receiving a registration request from a first communication client, the first communication client being registered in association with a device group. The apparatus further comprises means for provisioning the first communication client and the second communication client according to the registration request, the means for provisioning being responsive to at least a determination that there does exist a second communication client registered in association with the device group.

According to the third broad aspect of the present invention, there is provided a system. The system comprises a network element operable to receive a registration request from a first communication client, the first communication client being registered in association with a device group. The network element is further operable, responsive to a determination that there does exist a second communication client registered in association with the device group, to provision the first communication client and the second communication client according to the registration request.

According to the fourth broad aspect of the present invention, there is provided a method. The method comprises receiving a registration request from a first communication client. The method further comprises determining a device group associated with the first communication client, the device group comprising the first communication client and at least a second communication client. The method further comprises receiving a request for an incoming call destined for the first communication client and transmitting the request to the first communication client and to the at least a second communication client.

According to another broad aspect of the present invention, there is provided a computer-readable medium comprising computer-readable program code which, when executed by a computing apparatus, causes the computing apparatus:

to receive a registration request from a first communication client, said first communication client being registered in association with a device group;

responsive to a determination that there does exist a second communication client registered in association with said device group, to provision said first communication client and said second communication client according to said registration request.

These and other aspects and features of the present invention will now become apparent to those skilled in the art upon review of the following description of specific embodiments of the invention in conjunction with the accompanying drawings.

BRIEF DESCRIPTION OF THE DRAWINGS

Embodiments of the present invention are described with reference to the following figures, in which.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
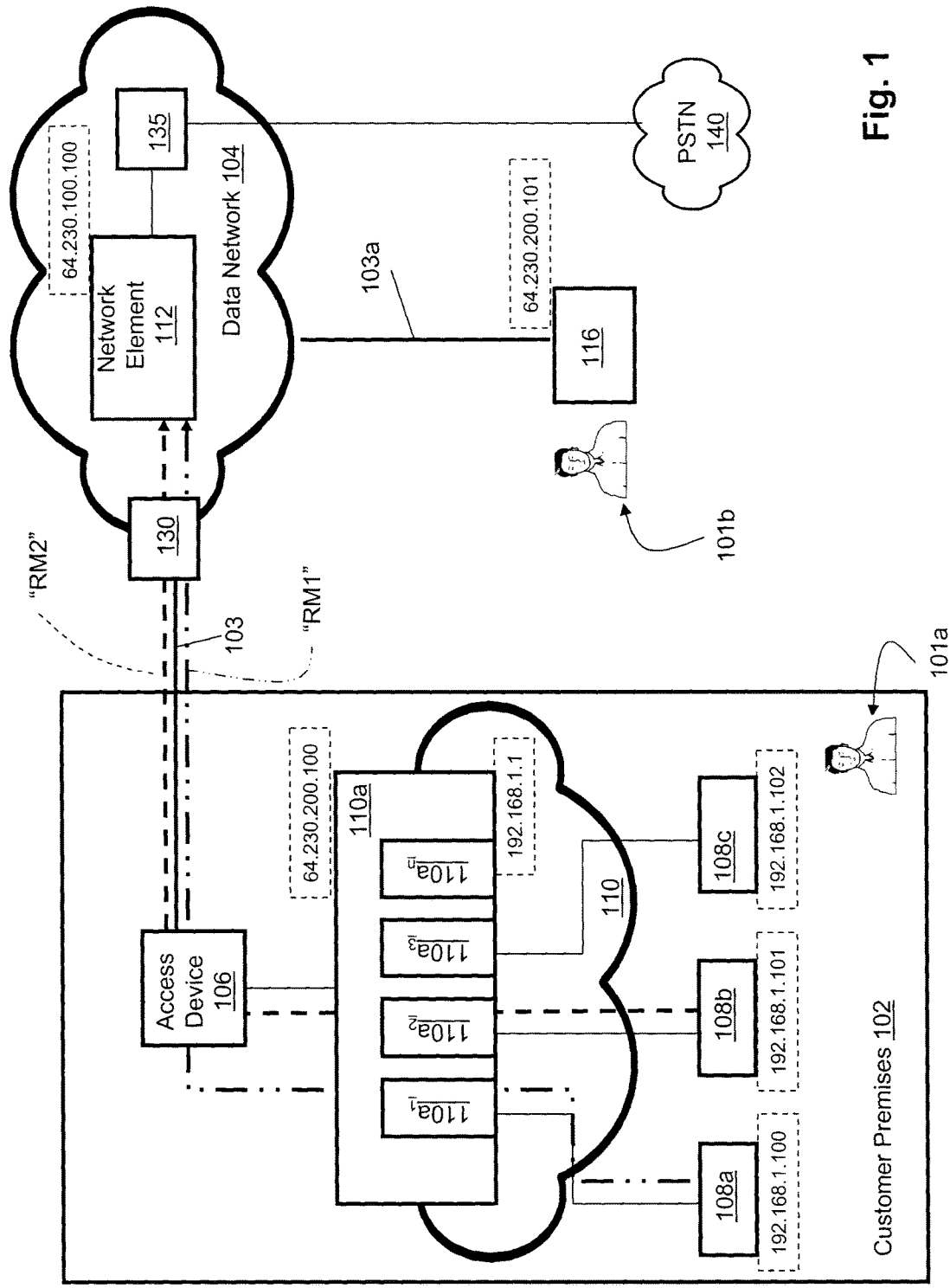
FIG. 1 is a diagram representing various components of a non-limiting embodiment of an infrastructure for logging into a communication client.

FIG. 1 shows various components of an infrastructure for logging into a communication client according to a non-limiting embodiment of the present invention. The infrastructure comprises a customer premises 102 associated with a user 101a. The customer premises 102 may be coupled to a data network 104 via an access connection 103. The customer premises 102 may comprise, but is not limited to, a house, a unit in a multi-dwelling unit (MDU), an office, etc. The data network 104 may comprise any data network suitable for satisfying communication needs of user(s) at the customer premises 102 (such as, for example, the user 101a). These communication needs can include exchanging data, entertainment, telephony and the like. In a specific non-limiting embodiment of the present invention, the data network 104 can comprise the Internet. However, in alternative non-limiting embodiments of the present invention, the data network 104 may comprise another type of a public data network, a private data network, a wireless data network and the like.

In an example non-limiting embodiment of the present invention, the access connection 103 can be a copper twisted pair, over which higher-layer protocols allow for the exchange of packets (ex. an xDSL-based access link). In an alternative non-limiting embodiment, the access connection 103 may comprise an Ethernet link, a fiber optic link (e.g., Fiber-to-the-Premise, Fiber-to-the-Curb, etc.), a wireless link (e.g., EV-DO, WiMax, WiFi, CDMA, TDMA, GSM, UMTS, and the like), coaxial cable link, etc., or a combination thereof. Generally speaking, the access connection 103 may comprise any type of wireless or wired connection that allows exchange of data between the customer premises 102 and the data network 104.

It should be noted that even though its depiction in FIG. 1 is greatly simplified, the data network 104 may comprise a number of network elements for facilitating exchange of data. For example, in the above-mentioned scenario where the access connection 103 is the xDSL-based link, the data network 104 may comprise a number of Digital Subscriber Line Access Multiplexers (DSLAMs), Outside Plant Interface DSLAMs (OPI-DSLAMs), edge routers, etc. In the above-mentioned scenario where the access connection 103 is a cable link, the data network 104 may comprise a number of cable headends, distribution hubs, etc. As a non-limiting example of these network elements, a DSLAM 130 has been depicted in FIG. 1. Persons skilled in the art will readily appreciate various configurations possible for the network elements that make up the data network 104 and, as such, these network elements need not be described here in great detail.

The customer premises 102 may comprise an access device 106 that facilitates exchange of data with the data network 104 via the access connection 103. In some embodiments of the present invention, the access device 106 may comprise a modem. Examples of modems that can be used include, but are not limited to, a cable modem, an xDSL modem and the like. In alternative embodiments of the present invention, which are particular true where the access connection 103 comprises Fiber-to-the-premise, the access device 106 may comprise an Optical Network Terminal (ONT). Naturally, the type of the access device 106 will depend on the type of the access connection 103 employed.

The customer premises 102 may comprise a number of communication clients coupled to the access device 106. Only three communication clients are depicted: a communication client 108a, a communication client 108b and a communication client 108c. Generally speaking, communication clients 108a, 108b and 108c can be implemented in hardware, software, firmware or a combination thereof. In a specific non-limiting example, the communication client 108a may comprise a VoIP phone, the communication client 108b may comprise a second VoIP phone and the communication client 108c may comprise a computing apparatus executing a soft client for handling VoIP calls. It should be understood that the customer premises 102 may comprise a number of additional communication clients that may include, but are not limited to, other VoIP phones, a wireless VoIP phone (such as, for example, a J2ME wireless phone), a Plain Old Telephone System (POTS) phone equipped with an Analog Terminal Adapter (ATA), other computing apparatuses executing soft clients, a set-top box, a gaming device, a security system and the like. The number of communication clients installed within the customer premises 102 is not limited other than by business considerations of a service provider who manages the access connection 103. Put another way, the customer premises 102 may comprise two or more communication clients similar to the communication clients 108a, 108b, 108c.

In some embodiments of the present invention, some of the communication clients located at the customer premises 102 may be connected to a communication network different from the data network 104, such as the Public Switched Telephone Network, a wireless communication network, etc.

In some embodiments of the present invention, the communication clients 108a, 108b and 108c may be coupled directly to the access device 106. However, in the specific non-limiting embodiment depicted in FIG. 1, the communication clients 108a, 108b and 108c are coupled to the access device 106 via a local data network 110. In some non-limiting embodiments of the present invention, the local data network 110 may comprise a wired Ethernet-based network. In another non-limiting embodiment of the present invention, the local data network 110 may comprise a wireless network (ex. a Wi-Fi based network, a Wi-Max based network, BlueTooth® based network and the like). It should be noted that any other type of local data network 110 or a combination of the example networks can be used. In some of these embodiments, the local data network 110 may comprise a home gateway 110a that mediates communication between the communication clients 108a, 108b and 108c and the access device 106. The home gateway 110a may comprise a wireless router, a wired router or a combined wireless/wired router.

The home gateway 110a may comprise several ports for connecting to the communication clients 108a, 108b, 108c. For example, the communication client 108a may be associated with a port $110a_1$. The communication client 108b can be associated with a port $110a_2$ and the communication client 108c can be associated with a port $110a_3$. The home gateway 110a may have a number of additional ports for accepting connections from any additional communication clients within the customer premises 102, these additional ports being commonly depicted at $110a_n$.

In some non-limiting embodiments of the present invention, the functionality of the access device 106 and the home gateway 110a may be embodied in a single device. In other non-limiting embodiments of the present invention, the functionality of the access device 106 and/or the home gateway 110a may be integrated into one of the communication clients 108a, 108b, 108c. In yet further alternative non-limiting embodiments of the present invention, the home gateway 110a and the local data network 110 can be omitted from the infrastructure of FIG. 1. This is particularly applicable in those non-limiting embodiments where the communication clients 108a, 108b or 108c are coupled to the access device 106 directly and, as such, the local data network 110 and the home gateway 110a can be omitted. Yet in other alternative non-limiting embodiments of the present invention, some of the communication clients 108a, 108b and 108c (as well as other communication clients potentially located within the customer premises 102, but omitted from the infrastructure of FIG. 1 for the sake of simplicity) may be coupled directly to the access device 106, while others of the communication clients 108a, 108b and 108c (as well as other communication clients potentially located within the customer premises 102, but omitted from the infrastructure of FIG. 1 for the sake of simplicity) may be coupled to the access device 106 via the local data network 110 and the home gateway 110a.

It should be understood that the infrastructure of FIG. 1 may comprise a number of additional communication clients outside the customer premises 102, coupled to the data network 104. As a non-limiting example only, the infrastructure of FIG. 1 may comprise a communication client 116 associated with another user (such as, for example, a user 101b). This communication client 116 may be coupled to the data network 104 via an access connection 103a. The communication client 116 may comprise one or more of a VoIP phone, a POTS phone equipped with an Analog Terminal Adapter (ATA), a computing apparatus executing a soft client, a set-top box, a gaming device, a security system and the like. The access connection 103a may be substantially similar to the access connection 103. However, it should be understood that the access connection 103 and the access connection 103a need not be of the same type in every embodiment of the present invention. For example, in some non-limiting embodiments of the present invention, the access connection 103 may comprise an xDSL-based link, while the access connection 103a may comprise a Fiber-to-the-Premise based link. Naturally, a myriad of other non-limiting combinations of how the access connections 103, 103a can be implemented are possible.

For the purposes of establishing communication sessions and terminating communication sessions (including, but not limited to, exchanging data associated with a VoIP call) between, for example, one of the communication clients 108a, 108b, 108c and another communication client (such as, for example, the communication client 116) via the data network 104, the data network 104 may comprise a network element 112. In some embodiments of the present invention, the network element 112 can comprise an apparatus sometimes referred to in the industry as a "soft switch" and that comprises circuitry, software and/or control logic for providing various communication features to VoIP clients (such as, for example, the VoIP clients 108a, 108b, 108c and 116) coupled to the data network 104. Examples of such communication features include (i) connecting incoming calls to the communication clients (such as, for example, the communication clients 108a, 108b, 108c and 116); and (ii) handling outgoing calls originated from the communication clients (such as, for example, the communication clients 108a, 108b, 108c and 116). Other examples of communication features that can be performed by the network element 112 can include but are not limited to call waiting, call forwarding, and so on. Persons skilled in the art will appreciate that the network element 112 may have other configurations.

In some embodiments of the present invention, the network element 112 may further comprise circuitry, software and/or control logic for performing at least one of the following functions: synthesizing voice messages, providing audio mixing capabilities, receiving and interpreting speech utterances, detecting DTMF tones and the like. In an alternative non-limiting embodiment of the present invention, some or all of these additional functions may be performed by one or more other devices (not depicted) connected to and under control of the network element 112. Furthermore, among other functions performed by the network element 112, the network element 112 can maintain an active call table (not depicted) which logs all active communication sessions maintained by all communication clients registered to the network element 112 (such as, for example, the communication clients 108a, 108b, 108c and 116).

In addition, the network element 112 can comprise suitable circuitry, software and/or control logic for exchanging calls with entities outside the data network 104. This is particularly convenient, when a call is placed by the user of one of the communication clients that the network element 112 serves (i.e. a user 101a of one of the communication clients 108a, 108b, and 108c or the user 101b of the communication client 116) to a telephone number that is reachable only via the Public Switched Telephone Network (PSTN), which is depicted at 140 in FIG. 1 or a wireless communication network, and vice versa. In an alternative non-limiting embodiment of the present invention, the infrastructure of FIG. 1 may comprise a separate gateway 135 for mediating the communication flow between the data network 104 and the PSTN 140.

A non-limiting example of the network element 112 can be embodied in a MCS 5200 Soft Switch manufactured by Nortel Networks Ltd. of 8200 Dixie Road, Brampton, Ontario L6T 5P6, Canada. However, it should be expressly understood that the network element 112 can have various other configurations.

For the purposes of facilitating exchange of data (including, but not limited to, exchanging data associated with a VoIP call) via the data network 104, the home gateway 110a may be assigned a network address compatible with an addressing scheme of the data network 104. In some embodiments of the present invention, the network address can comprise an fPv4 address. In an alternative embodiment of the present invention, the network address can comprise an IPv6 address. In an alternative non-limiting embodiment of the present invention, the network address can comprise any other suitable type of a unique identifier, such as, for example, a media access control (MAC) address, a proprietary identifier and the like.

How the home gateway 110a is assigned the network address is not particularly limited. For example, in some non-limiting embodiments of the present invention, the home gateway 110a may be assigned a static network address. This static network address may be assigned to the home gateway 110a before the home gateway 110a is shipped to the customer premises 102, during an initial registration process or at another suitable time. In another non-limiting embodiment of the present invention, the home gateway 110a may be assigned a dynamic network address. For example, in a non-limiting scenario, a Dynamic Host Configuration Protocol (DHCP) server (not depicted) may be used to assign the dynamic network address (such as, for example, a dynamic IP address) to the home gateway 110a. In alternative non-limiting embodiments of the present invention, the home gateway 110a can obtain its network address by establishing a PPPoE session with a provisioning server (not depicted). Other alternative implementations are, of course, possible. In an alternative non-limiting embodiment of the present invention, which is particularly applicable in a scenario where the home gateway 110a is omitted, the access device 106 may be assigned a network address.

Each of the communication clients 108a, 108b and 108c is be assigned a respective network address for the purposes of receiving and transmitting data via the home gateway 110a, the access device 106 and the data network 104. Several non-limiting embodiments as to how the network addresses of the communication clients 108a, 108b and 108c can be assigned are envisioned:

Public Network Addresses
  In some embodiments of the present invention, the communication clients 108a, 108b and 108c can be assigned network addresses that are routable or, in other words, are visible to the data network 104 and other devices connected thereto (such as, for example, the network element 112, the communication client 116). The routable network addresses are sometimes also referred to as "global" or "public" network addresses. For example, if the data network 104 implements an IPv6 address scheme, it is envisioned that each of the communication clients 108a, 108b and 108c may be assigned a unique public IP address. In some of these non-limiting embodiments, there may be no need for the local data network 110 and/or the home gateway 110a.

Private Network Addresses
  In other embodiments of the present invention, each of the communication clients 108a, 108b and 108c can be assigned what is called a "local" or "private" network address. In these non-limiting embodiments, the private network addresses are used for the purposes of identifying the communication clients 108a, 108b and 108c within the local data network 110, while communication outside of the local data network 110 is implemented by using the aforementioned public network address assigned to the home gateway 110a (or, in some cases, the access device 106). In some non-limiting embodiments of the present invention, the home gateway 110a may be responsible for assigning private network addresses to the communication clients 108a, 108b and 108c. However, this need not be the case in every embodiment of the present invention. For example, the private network addresses can be assigned to the communication clients 108a, 108b and 108c by a dedicated address server (not depicted) coupled to the local data network 110.

In the specific non-limiting example depicted in FIG. 1, each of the communication clients 108a, 108b and 108c can be assigned a private network address by the home gateway 110a. For the sole purpose of simplifying the description to be presented herein below, it is assumed that both the private and the public network addresses are Internet Protocol (IP) addresses assigned according to the IPv4 protocol. However, it is expected that one of ordinary skilled in the art will easily adapt the teachings to be presented herein below to other addressing schemes.

Accordingly, the home gateway 110a may be assigned two IP addresses: a first IP address for the purposes of communicating with devices on the data network 104 (i.e. a so-called "network facing interface" IP address) and a second IP address for the purposes of communicating with devices on the local data network 110 (i.e. a so-called "premise facing interface" IP address). For example, the network facing interface may be embodied in a public IP address "64.230.200.100". The assignment of this public IP address can be done by the aforementioned DHCP server (not depicted) coupled to the data network 104. The premise facing interface IP address may be embodied in a private IP address "192.168.1.1".

The home gateway 110a can be responsible for assigning private IP addresses to the communication clients 108a, 108b and 108c. For example, the communication client 108a may be assigned a private IP address "192.168.1.100", the communication client 108b may be assigned a private IP address "192.168.1.101" and the communication client 108c may be assigned a private IP address "192.168.1.102".

As one skilled in the art will appreciate, in the specific embodiment depicted in FIG. 1, the private IP addresses assigned to the communication clients 108a, 108b and 108c, as well as the private IP address assigned to the premise facing interface of the home gateway 110a, are only routable within the local data network 110, while the public IP address assigned to the network facing interface of the home gateway 110a is routable within the data network 104. Accordingly, in order to facilitate exchange of data between the communication clients 108a, 108b and 108c and the data network 104, the home gateway 110a can be operable to implement a Network Address Translation (NAT) operation or, in other words, to translate the private IP addresses assigned to the communication clients 108a, 108b and 108c for the purposes of routing data packets to/from the communication clients 108a, 108b and 108c using the public IP address assigned to the home gateway 110a.

NAT operation is known to those of skill in the art and, as such, no detailed description of the process will be presented here. However, for the benefit of the reader a brief overview will be presented. Recalling that each of the communication clients 108a, 108b and 108c can be associated with a port of the home gateway 110a, the home gateway 110a can be operable to receive packets from one of the communication clients 108a, 108b and 108c (i.e. outgoing packets) and to substitute a source address of received outgoing packets, which in this non-limiting example can be a private IP address, with the network facing public IP address associated with the home gateway 110a. The home gateway 110a can further be operable to compile an internal mapping table (not depicted). The internal mapping table correlates (a) an original source address (i.e. the private IP address of a specific one of the communication clients 108a, 108b, 108c that has originated the outgoing packets) and a port number associated with the specific one of the communication clients 108a, 108b, 108c to (b) the aforementioned network facing public IP address of the home gateway 110a and a chosen port number whereby allowing two-way exchange of packets between one or more of the communication clients 108a, 108b and 108c with any other device on the data network 104 (such as, for example, the communication client 116).

In a similar manner, the communication client 116 may be associated with a network address. As a non-limiting example that is presented in FIG. 1, the communication client 116 can be directly coupled to the data network 104 without the use of a home gateway. This is particularly true in those embodiments, where the communication client 116 is embodied in a soft client executed on a computing apparatus, for example. In a non-limiting example, communication client 116 may be associated with an IP address "64.230.200.101", which may be a public IP address or, in other words, an IP address routable within the data network 104. For the purposes of a non-limiting illustration to be presented herein, it is assumed that the communication client 116 is coupled directly to the access connection 103a and, as such, exchange of data with the data network 104 can be performed without the need for any port number mapping.

Before describing methods for logging into a communication client according to various embodiments of the present invention, a registration process by virtue of which communication clients 108a, 108b, 108c can generally register with the network element 112 will be described. For the purposes of exchanging data and, more specifically, for the purposes of establishing a communication session (such as, for example, a VoIP call) between one or more of the communication clients 108a, 108b, 108c and 116 (as well as potentially other communication clients), a registration process executed at the network element 112 can be implemented. For the sole purpose of simplifying the description to be presented herein below, an example of the communication session being a VoIP call will be used. However, it should be expressly understood that the type of communication sessions or the data exchanged between the communication clients 108a, 108b, 108c and 116 is not particularly limited and may include a video call, an instant messaging session or a multimedia session, to name just a few possibilities.

Figure 2A:
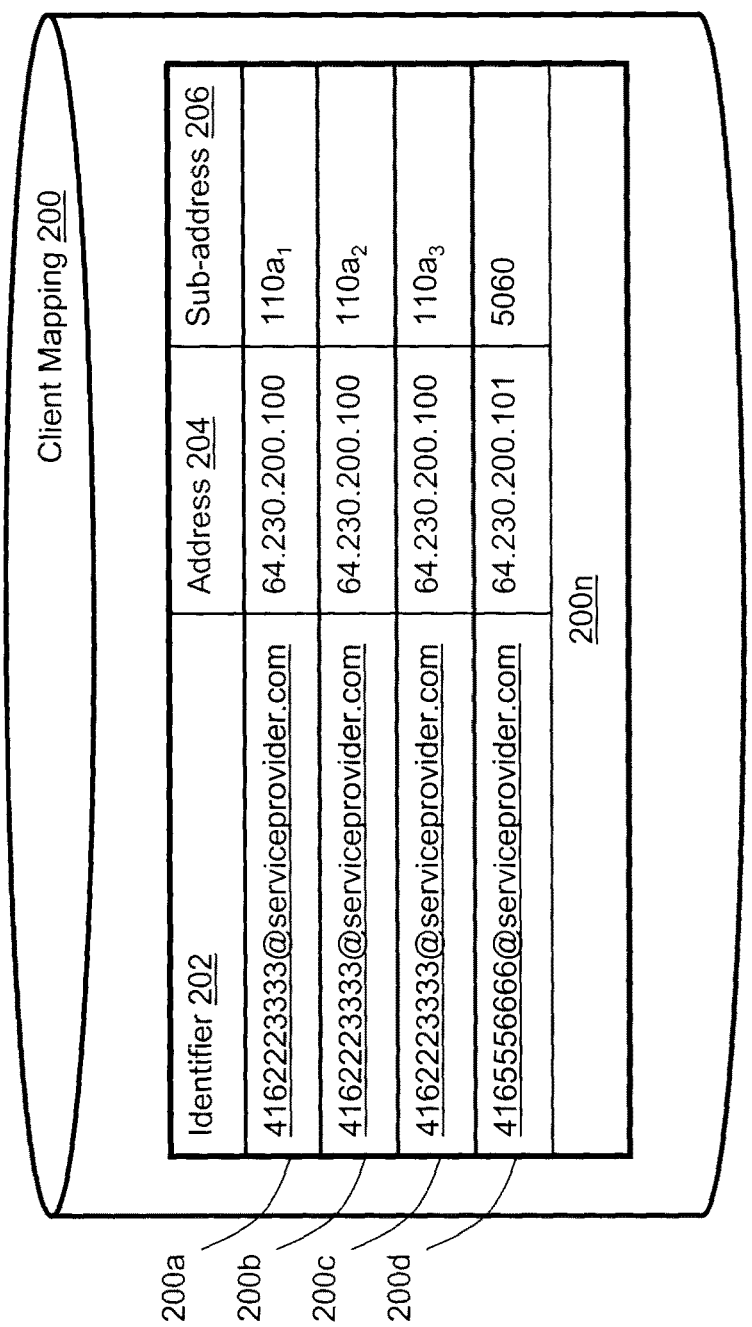
FIG. 2A is a diagram representing a non-limiting embodiment of a client mapping maintained by a network element of FIG. 1.

Before describing the registration process in detail, a client mapping 200 will now be described in greater detail with reference to FIG. 2A. The client mapping 200 can be maintained by the network element 112 of FIG. 1 for the purposes of facilitating establishing of communication sessions between the communication clients 108a, 108b, 108c, 116 via the data network 104. The network element 112 can maintain the client mapping 200 in an internal database or in a separate database (not depicted) accessible to and under control of the network element 112.

The mapping 200 may maintain a plurality of records, such as records 200a, 200b, 200c and 200d. Each of the records 200a, 200b, 200c and 200d may maintain information about registered communication clients, such as for example, communication clients 108a, 108b, 108c and 116 respectively. Each of the records 200a, 200b, 200c and 200d may maintain a relationship between an identifier 202, an address 204 and a sub-address 206.

In the specific non-limiting embodiment, the identifier 202 may comprise an alias or another identifier of a user (such as one of the users 101a, 101b) to which a particular communication client is registered to. Some non-limiting examples of the identifier 202 include, but are not limited to, a user account, a proprietary identifier, a network address and the like. In the specific non-limiting embodiment to be presented herein below, the identifier 202 comprises a Session Initiation Protocol (SIP) Universal Resource Identifier (URI) address assigned on a per user account basis or, in other words, all communication clients registered to the same user are associated with the same identifier 202. Typically, all the communication clients registered to the same user account are said to be associated with the same user, but this need not be so in every embodiment of the present invention. For example, in an alternative non-limiting embodiment of the present invention, which is particularly applicable where the customer premises 102 comprises an office and where the subscriber to the communication service (i.e. a company) and the user of the communication client(s) (i.e. an employee) are different, the communication clients can be registered to the same user account associated with the company and may be used by various employees of that company. For the avoidance of doubt, it should be expressly understood that the user account can be associated with the user 101a, as well as other users residing at the customer premises 102.

The address 204 may comprise an indication of a public network address associated with an endpoint where the communication client is located (such as, for example, the customer premises 102), such as, for example, an IP address, a proprietary network identifier, etc. The sub-address 206 may contain an identifier that may be used to uniquely identify a particular communication client within its local data network should this be the case (such as, for example, within the local data network 110 of the customer premises 102). For example, in the non-limiting example to be presented herein below, the sub-address 206 may comprise an indication of a port number of the home gateway 110a within the local data network 110 associated with a particular communication client. In an alternative non-limiting embodiment of the present invention, the sub-address 206 may comprise another suitable identifier, such as, for example, a private IP address. In an alternative non-limiting embodiment of the present invention, the sub-address 206 may comprise a value which represents a translated version of the port number of the home gateway 110a. In yet further non-limiting embodiments of the present invention, the sub-address 206 may comprise an arbitrary value assigned by the home gateway 110a. In alternative embodiments of the present invention, which are particularly applicable where the communication clients 108a, 108b, 108c and 116 can be assigned a public network address, the sub-address 206 may comprise a default value or may be omitted. In the specific non-limiting example being presented herein, the communication client 116 may be associated with the public IP address and, as such, the sub-address 206 associated with the communication client 116 may be a default port value.

The data maintained in the identifier 202 is referred to sometimes herein below as a "user account identifier" and the data maintained in the address 204 and sub-address 206 is jointly referred to as a "communication client identifier". In some examples, as described above, the communication client identifier may only comprise the address 204.

In the specific non-limiting example being described herein, the record 200a may be associated with the communication client 108a. As such, the identifier 202 of the record 200a may comprise an alias of the user 101a to whom the communication client 108a is registered or, in other words, who is the subscriber to communication services at the customer premises 102, such as, a SIP URI 4162223333@serviceprovider.com. It should be expressly understood that any other suitable form of the identifier 202 can be used, such as a numerical value, an alpha-numerical value, etc. The address 204 of the record 200a may comprise the public IP address associated with the home gateway 110a, which, in the specific non-limiting example being presented herein, is the public IP address "64.230.200.100". The sub-address 206 of the record 200a may comprise an indication of the port number of the home gateway 100a which is associated via the aforementioned internal mapping table within the home gateway 110a with the communication client 108a or, in this non-limiting example, it may comprise "$110a_1$".

In a similar manner, the record 200b can be associated with the communication client 108b. Since in the non-limiting example being presented herein, the communication client 108b is associated with the same customer premises 102 as the communication client 108a, then for the purposes of the non-limiting example to be presented herein below, it is assumed that the communication client 108b is to be registered with the same user 101a. Accordingly, the identifier 202 of the record 200b can comprise an alias of the user 101a who is the subscriber to communication services at the customer premises 102, such as, a SIP URI 4162223333@serviceprovider.com. It should be expressly understood that any other suitable form of the identifier 202 can be used, such as a numerical value, an alpha-numerical value, etc. The address 204 of the record 200b may comprise the public IP address associated with the home gateway 110a, which, in the specific non-limiting example being presented herein, is the public IP address "64.230.200.100". The sub-address 206 of the record 200b may comprise an indication of the port number of the home gateway 110a which is associated via the aforementioned internal mapping table within the home gateway 110a with the communication client 108b or, in this non-limiting example, it may comprise "$110a_2$".

In a similar manner, the record 200c can be associated with the communication client 108c. Since in the non-limiting example being presented herein, the communication client 108c may be associated with the same customer premises 102 as the communication clients 108a, 108b, then for the purposes of the non-limiting example to be presented herein below, it is assumed that the communication client 108c is to be registered with the same user 101a as the communication clients 108a, 108b. Accordingly, the identifier 202 of the record 200c can comprise an alias of the user 101a who is the subscriber to communication services at the customer premises 102, such as, a SIP URI 4162223333@serviceprovider.com. It should be expressly understood that any other suitable form of the identifier 202 can be used, such as a numerical value, an alpha-numerical value, etc. The address 204 of the record 200c may comprise the public IP address associated with the home gateway 110a, which, in the specific non-limiting example being presented herein, is the public IP address "64.230.200.100". The sub-address 206 of the record 200c may comprise an indication of the port number of the home gateway 110a which is associated via the aforementioned internal mapping table within the home gateway 110a with the communication client 108c or, in this non-limiting example, it may comprise "$110a_3$".

The record 200d may be associated with the communication client 116. The identifier 202 of the record 200d may comprise an alias of the user 101b to whom the communication client 116 is registered to or, in other words, who is the subscriber to communication services at a location where the communication client 116 is located, such as, a SIP URI 4165556666@serviceprovider.com. It should be expressly understood that any other suitable form of the identifier 202 can be used, such as a numerical value, an alpha-numerical value, etc. The address 204 of the record 200d may comprise the public IP address associated with the communication client 116, which, in the specific non-limiting example being presented herein, is the public IP address "64.230.200.101". The sub-address 206 of the record 200d may comprise an indication of the default port used for exchanging data between the communication client 116 and the data network 104 or, in this non-limiting example, it may comprise the default port number "5060". In alternative embodiments of the present invention, the sub-address 206 can be left blank. In further embodiments of the present invention, when the exchanging of data is implemented using the default port, the sub-address 206 field can be omitted altogether.

The client mapping 200 may maintain a number of additional records, jointly depicted at 200n. These additional records 200n may be associated with other communication clients of the infrastructure of FIG. 1, which have been omitted for the sake of simplicity. How the client mapping 200 is populated is not particularly limited. In a specific non-limiting embodiment of the present invention, the client mapping 200 may be populated during a registration process of the communication clients 108a, 108b, 108c and 116 with the network element 112.

Prior to describing the registration process, certain non-limiting assumptions will be made for the sole purpose of illustrating and providing an example for the description to be presented below.

Firstly, it is assumed that the communication clients 108a, 108b, 108c and 116 and the network element 112 implement a communication protocol for establishing and terminating communication sessions. In a specific non-limiting embodiment of the present invention, the communication protocol may comprise Session Initiation Protocol (SIP). In an alternative non-limiting embodiment of the present invention, the communication protocol may comprise Simple Object Access Protocol (SOAP) or it may comprise ITU-T's H.323 signalling protocol. It should be expressly understood that any suitable communication protocol may be used, whether standards-based or proprietary. Some examples of the proprietary protocols that can be used include, but are not limited to, UNISTIM, MiTAI, Skiny, etc.

Secondly, it is assumed that each of the communication clients 108a, 108b, 108c and 116 is aware of the location of the network element 112 or, in other words, a network address associated with the network element 112. In some embodiments of the present invention, the network element 112 may be associated with a static network address, such as, but not limited to, a static IP address "64.230.100.100". In these embodiments of the present invention, the communication clients 108a, 108b, 108c and 116 may be pre-programmed with the static IP address of the network element 112. In an alternative embodiment of the present invention, the network element 112 may be associated with a Uniform Resource Locator (URL), such as, for example, "http://www.soft-switch.serviceprovider.com". In these non-limiting embodiments of the present invention, the communication clients 108a, 108b, 108c and 116 may be pre-programmed with the URL of the network element 112. In yet further non-limiting embodiments of the present invention, the network element 112 may be associated with a dynamic network address, such as, for example, a dynamic IP address. In these non-limiting embodiments of the present invention, the communication clients 108a, 108b, 108c and 116 may discover the dynamic IP address of the network element 112 via an appropriate address discovery procedure, such as, for example, a Domain Name Service (DNS) look up. In some non-limiting embodiments of the present invention, the home gateway 110a or the access device 106 can be aware of the location of the network element 112 rather than the communication clients 108a, 108b, 108c. It should be noted that in alternative non-limiting embodiments of the present invention, the communication clients 108a, 108b, 108c may not be aware of the location of the network element 112. They may be, instead, be aware of the location of another network element (such as, for example, a Session Border Controller, a proxy server, etc.).

Figure 3:
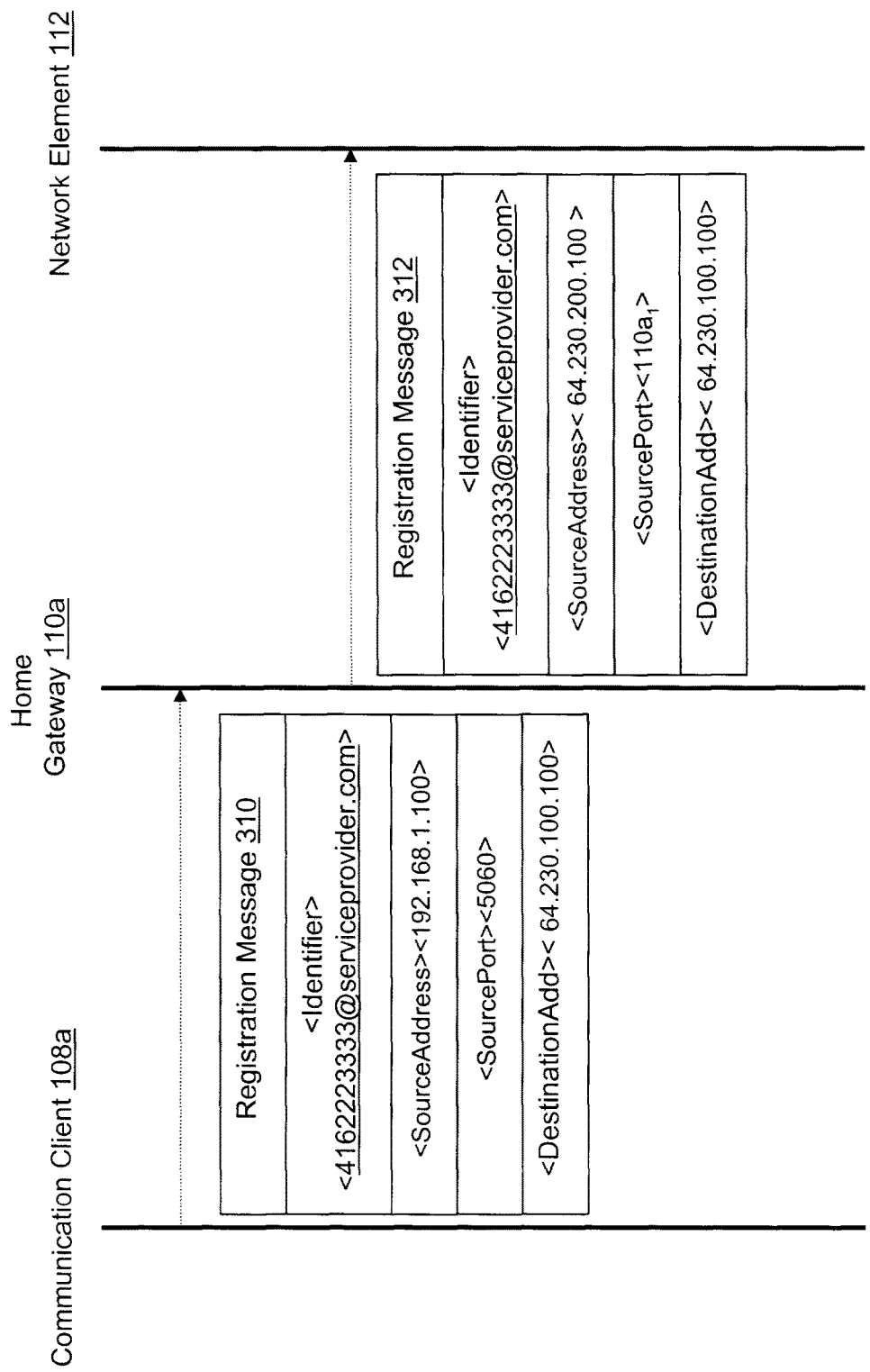
FIG. 3 is a signal flow diagram depicting a non-limiting embodiment of a flow of signals exchanged between a communication client and the network element of FIG. 1 during a registration process.

Having made these non-limiting assumptions, a registration process by virtue of which the communication clients 108a, 108b, 108c and 116 can register with the network element 112 will now be described in greater detail. With reference to FIG. 3, an example of how the communication client 108a can register with the network element 112 will now be described. In some non-limiting embodiments of the present invention, the communication client 108a may perform the registration process, when the communication client 108a is powered on for the first time. In an alternative non-limiting embodiment of the present invention, the communication client 108a may perform the registration process after being unplugged and moved to a new location. In yet further non-limiting embodiments of the present invention, the communication client 108a can perform the registration process on-demand, for example, when triggered by the user 101a, by an application executed on the communication client 108a or by an application executed on another device in the customer premises 102 or connected to the data network 104. For example, each of the records 200a-200n may be assigned an "expiry" indicator. The expiry indicator can be set by the network element 112, it can be requested by the communication client submitting a registration request or it can comprise a default value (ex. 3600 seconds or the like). When the "expiry" indicator expires or shortly thereafter, the network element 112 may cause the respective communication client associated with the expired record 200a-200n to re-execute the registration process.

It should be noted that in alternative non-limiting embodiments of the present invention, a service provider who is responsible for managing the network element 112 can pre-provision the client mapping 200. Within these embodiments of the present invention, the registration process can be omitted. This scenario is particularly applicable in those non-limiting embodiments of the present invention, where the communication clients 108a, 108b, 108c, 116 and/or the home gateway 110a are assigned a static network address.

It should be noted that in some non-limiting embodiments of the present invention, each of the communication clients 108a, 108b, 108c and 116 may be aware of its respective identifier 202. How the communication clients 108a, 108b, 108c and 116 may become aware of their respective identifiers 202 is not particularly limited. In some embodiments of the present invention, an indication of the identifier 202 may be programmed into the communication clients 108a, 108b, 108c and 116 before they are dispatched to the respective users 101a, 101b. However, in alternative non-limiting embodiments of the present invention, the indication of the identifier 202 can be inputted by the respective user 101a, 101b during the registration process. In an alternative non-limiting embodiment of the present invention, the indication of the identifier 202 can be determined by the communication client 108a by interacting with the home gateway 110a or with the access device 106. For the purposes of the non-limiting example to be presented herein below, it is assumed that the user 101a has inputted the indication of the identifier 202 (i.e. 4162223333@serviceprovider.com) into the communication client 108a.

The communication client 108a generates a registration message 310, which can be, but is not limited to, a SIP registration message. The registration message 310 can comprise an indication of an identifier of the communication client 108a, such as the SIP URI 4162223333@serviceprovider.com (i.e. an "identifier"). The registration message 310 can further comprise an indication of a network address of the communication client 108a (ex. a so-called "source address"), which in this non-limiting example can comprise the private IP address of the communication client 108a (i.e. the private IP address 192.168.1.100) and an indication of a source port, which can be a default TCP/UDP port value (ex. "1080"). The registration message 310 can further comprise an indication of the network address of the network element 112 (ex. the public IP address 64.230.100.100), i.e. a so-called "destination address". In an alternative non-limiting embodiment of the present invention, the destination address may be omitted from the registration message 310. Within these embodiments of the present invention, the destination address can be populated, for example, by the home gateway 110a as part of compiling a registration message 312 to be described below or by another entity. In further alternative non-limiting embodiments of the present invention, the identifier of the communication client 108a can be omitted from the registration message 310. Within these embodiments of the present invention, the identifier of the communication client 108a can be populated, for example, by the home gateway 110a as part of compiling a registration message 312 to be described below or by another entity. The communication client 108a then sends the registration message 310 towards the home gateway 110a via the local data network 110, using for example, SIP protocol.

The home gateway 110a receives the registration message 310 and compiles the registration message 312 by augmenting data received as part of the registration message 310. To that end, the home gateway 110a creates the registration message 312 by replacing the value in the received source address field by its own public IP address, which in this non-limiting example can comprise the public IP address of the home gateway 110a (i.e. the public IP address "64.230.200.100"). The home gateway 110a further substitutes the value of the received source port with the source port number of the home gateway 110a associated with the communication client 108a (ex. "110$a_1$") or another logical indication of the communication client 108a. The home gateway 110a then sends the registration message 312 towards the network element 112 via the access device 106 and the data network 104.

When the network element 112 receives the registration message 312, it examines its content. In some embodiments of the present invention, the network element 112 further examines the content of a packet encapsulating the registration message 312. It retrieves the identifier of the communication client 108a from the registration message 312 and populates the identifier 202 of the record 200a. It then retrieves the source address and populates the address 204. Using the data received as part of the source port, the network element 112 populates the sub-address 206. Accordingly, the network element 112 is operable to populate the aforementioned record 200a with the information received as part of the registration message 312. If the network element 112 determines that the record 200a associated with the communication client 108a already exists (i.e. an old record 200a), the network element 112 can delete the old record 200a and populate a new record 200a with the identifier 202, the address 204 and the sub-address 206 received as part of the registration message 312. Alternatively, the network element 112 can modify a portion of the old record 200a to derive the new record 200a.

In substantially the same manner, the communication clients 108b and 108c can generate and transmit registration messages similar to the registration messages 310 to enable the network element 112 to populate records 200b and 200c respectively. The communication client 116 can generate a registration message similar to the registration message 312 with a default port number as the sub-address 206 to enable the network element 112 to populate the record 200d.

It should be noted that in alternative non-limiting embodiments of the present invention, where the home gateway 110a is not SIP-aware, the home gateway 110a may perform NAT operation on an IP packet encapsulating the SIP registration request. Within these embodiments, the home gateway 110a amends information maintained within the IP packet encapsulating the SIP registration request and leaves the SIP registration request intact.

Figure 4A:
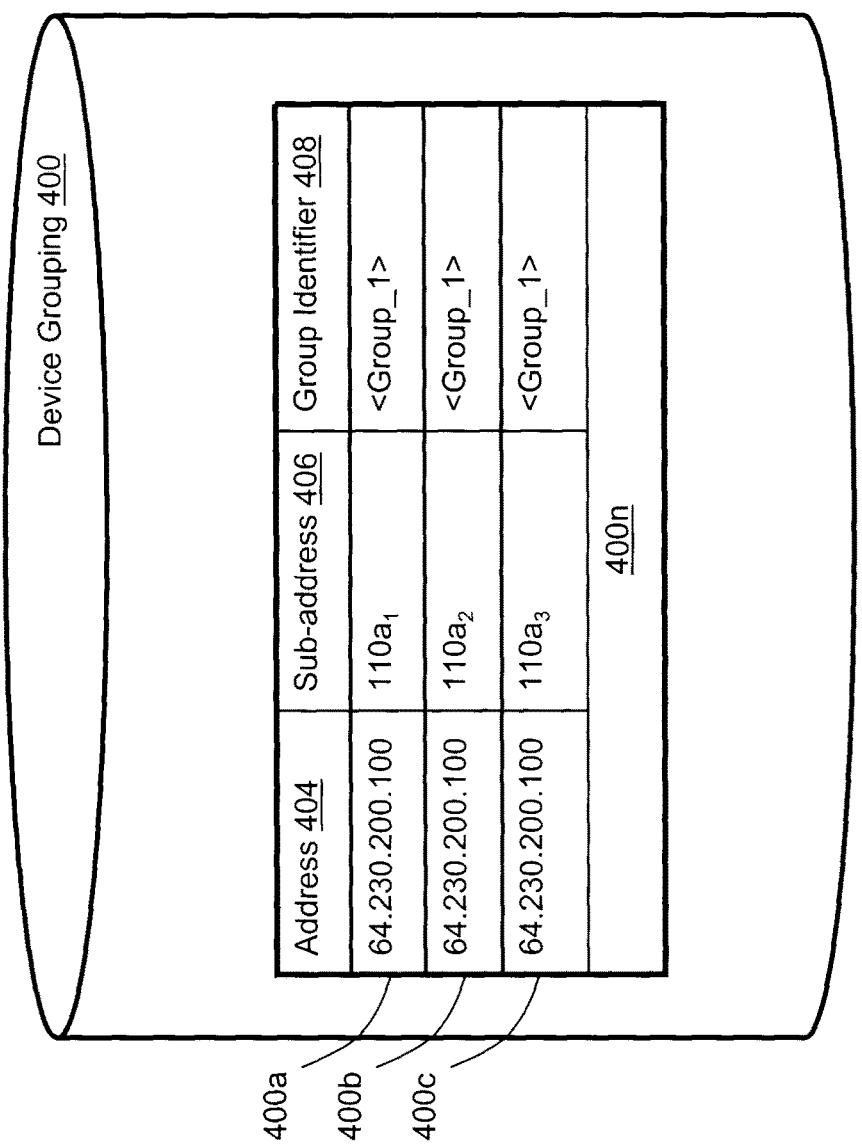
FIGS. 4A, 4B and 4C are diagrams depicting various non-limiting embodiments of a device grouping maintained by the network element of FIG. 1.

For the purposes of various non-limiting embodiments of the present invention, the network element 112 may further maintain a device grouping 400, a non-limiting embodiment of which is depicted in FIG. 4A. In some embodiments of the present invention, the device grouping 400 may be maintained in an internal database (not depicted) of the network element 112. In an alternative non-limiting embodiment of the present invention, the device grouping 400 may be maintained in a database (not depicted) accessible by the network element 112 via the data network 104 or another network. In yet further non-limiting embodiments of the present invention, the device grouping 400 may be integrated with the above-described client mapping 200. In yet further non-limiting embodiment of the present invention, the device grouping 400 can be maintained by another computing apparatus, such as an application server coupled to a plurality of network elements (including the network element 112), another server coupled to or within the data network 104, etc. People skilled in the art will appreciate that a myriad of other alternatives to implement the device grouping 400 are possible.

The device grouping 400 maintains a number of records, such as, for example, records 400a, 400b, 400c. Each of the records 400a, 400b, 400c may maintain a relationship between a given communication client (denoted by an address 404 and a sub-address 406) and a group identifier 208, the group identifier 208 maintaining data representative of at least one device group, which the given communication client is associated with. In some embodiments of the present invention, data maintained within the address 404 and the sub-address 406 can be substantially similar to the data maintained within the address 204 and the sub-address 206 of the client mapping 200. However, this need not be so in every embodiment of the present invention and it should be understood that the purpose of the address 404 and the sub-address 406 is to uniquely identify the given communication client with which the respective record is associated with and, as such, may take a myriad of forms.

For the purposes of a non-limiting illustration it shall be assumed that the records 400a, 400b, 400c are associated with the communication clients 108a, 108b, 108c and are meant to depict an association between the communication clients 108a, 108b, 108c and a device group "Group_1". How the association between a given one of the communication clients 108a, 108b, 108c and a given device group is provisioned is not particularly limited. For example, the user 101a (or another user) may interact with a given one of the communication clients 108a, 108b, 108c to enter an indication of a device group to which the given one of the communication clients 108a, 108b, 108c should be associated with (for example, by entering a pre-determined sequence of keys, interacting with one or more soft keys, etc). The given one of the communication clients 108a, 108b, 108c can then transmit the indication of the device group to the network element 112, for example, by transmitting a SIP INFO message or another suitable type of a signalling message).

In an alternative non-limiting embodiment of the present invention, the user 101a (or another user) can provide an indication of a device group, which a given one of the communication clients 108a, 108b, 108c is associated with by interacting with a web site or a web portal associated with a service provider that manages the network element 112, interacting with a customer services representative, transmitting an electronic message, completing a registration form and mailing it to the service provider that manages the network element 112 and the like.

In alternative non-limiting embodiments of the present invention, the indication of a particular device group can be populated automatically. For example, all communication clients located at a given location (such as, for example, the customer premises 102) can be associated with a particular device group. Within some of these non-limiting embodiments of the present invention, the above-described SIP URI associated with the given location can be used as an identifier of the particular device group. As such, within these non-limiting embodiments of the present invention, the device grouping 400 can be omitted and the above-mentioned identifier 202 can be used as an identifier of the particular device group.

One skilled in the art will appreciate that the device grouping 400 can be maintained in a number of alternatives ways. For example, an alternative non-limiting implementation of the device grouping 400 can map a given device group to one or more communication clients registered thereto. The device grouping 400 may, of course, maintain a number of additional mappings jointly depicted at 400n.

Figure 4B:
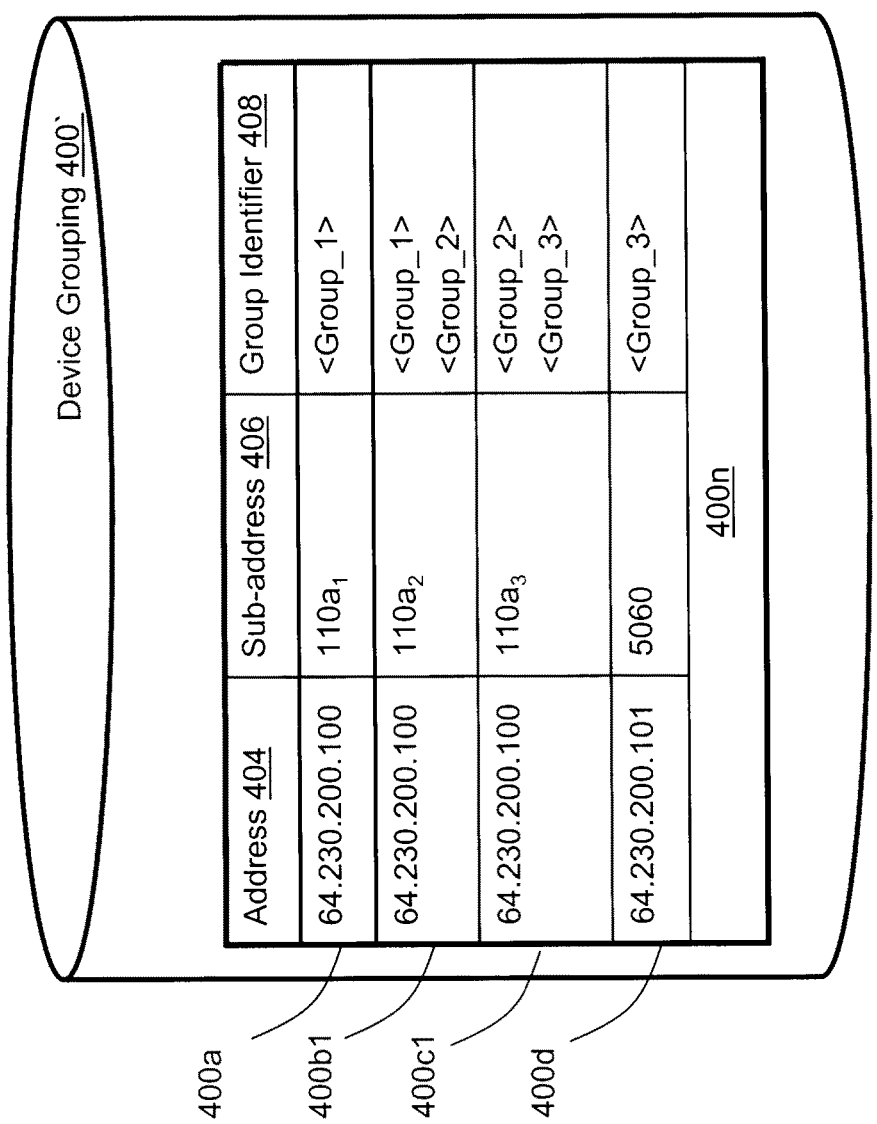

FIG. 4B depicts a non-limiting embodiment of a device grouping 400'. The device grouping 400' of FIG. 4B can be substantially similar to the device grouping 400 of FIG. 4A and, as such, like elements are depicted with like numerals. Within this non-limiting embodiment of the present invention, a given communication client can be associated with more than one device group. For example, the communication client 108b associated with a record 400b1 of FIG. 4B can be associated with two device groups—the device group "Group_1" and the device group "Group_2". The communication client 108c associated with the record 400c1 of FIG. 4B can be associated with two device groups—the device group "Group_2" and a device group "Group_3".

Even though the device grouping 400 has been illustrated with reference to the communication clients 108a, 108b, 108c all of which are located at the customer premises 102, this should not be construed as a limitation of embodiments of the present invention. For example, in the alternative embodiment of the device grouping 400' of FIG. 4B, the communication client 116 associated with the record 400d may be also part of the device group "Group_3", the same device group that the communication client 108c is registered to, even though the communication clients 108c, 116 may not be necessarily located within the same geographical location. As such, it should be expressly understood that a given device group can include communication clients that may not necessarily be located at a single geographical location and, as such, can include communication clients located, for example, in different buildings, cities or even countries for that matter or may include communication clients that are nomadic in nature. In an alternative non-limiting embodiment of the present invention, a first sub-group of communication clients of a given device group may be coupled to a first communication network and a second sub-group of communication clients within the given device group may be coupled to a second communication network.

Figure 5:
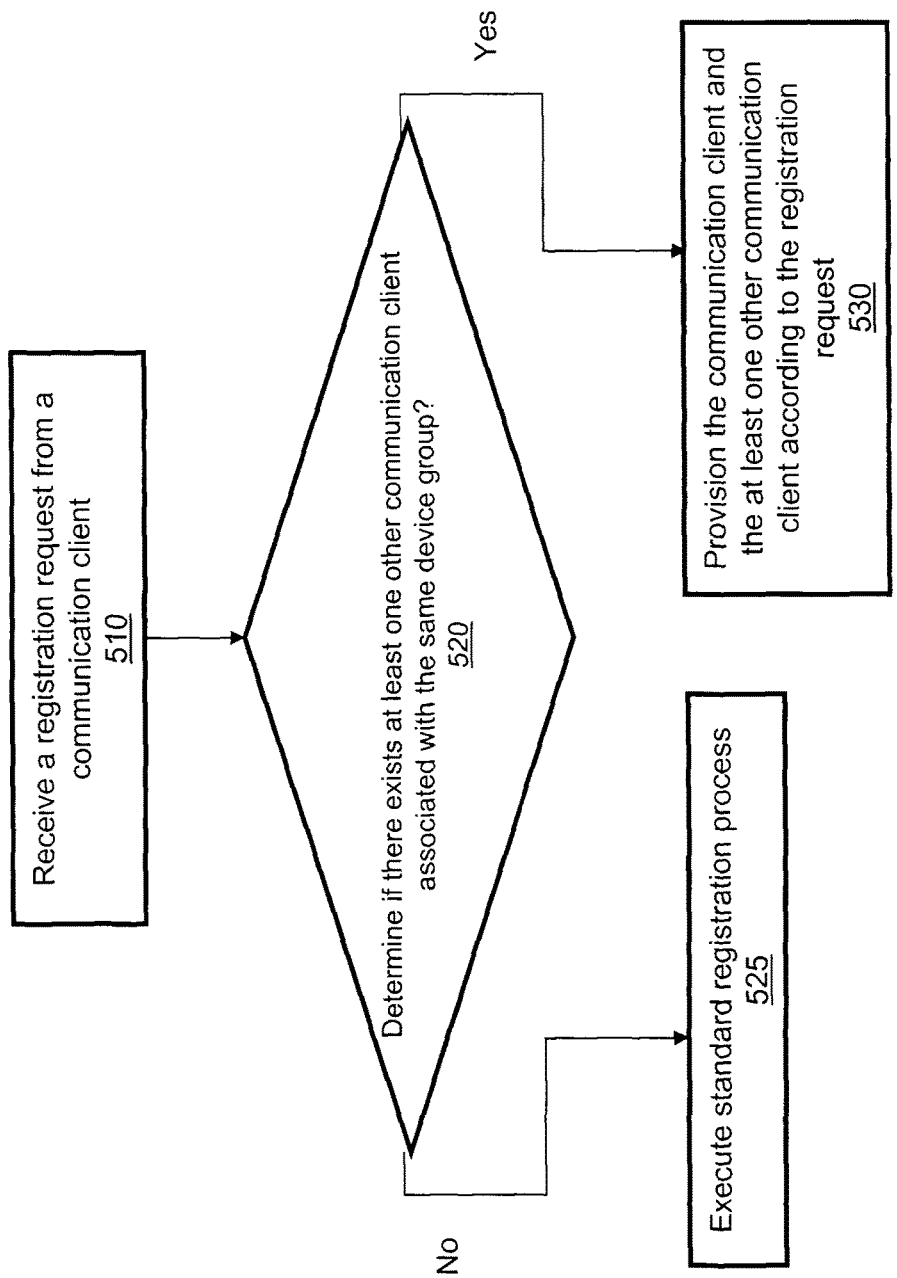
FIG. 5 is a flow chart representing a first non-limiting embodiment of a method for logging into the communication client within the infrastructure of FIG. 1.

Given the infrastructure of FIG. 1, it is possible to execute a method for logging into a communication client. With reference to FIG. 5, a first non-limiting embodiment of a method for logging into a communication client will be described. For the purposes of the description to be presented herein below, it is assumed that the device grouping 400 of FIG. 4A has been populated with records 400a, 400b, 400c associated with the communication clients 108a, 108b, 108c respectively. Examples of the various method steps to be presented herein below will be illustrated in the context of the following non-limiting scenario:

Let it be assumed that the user 101a is desirous of using communication clients located within customer premises 102 (i.e. the communication clients 108a, 108b, 108c) to initiate outgoing calls and to receive incoming calls destined at the SIP URI associated with the user 101a and, as such, needs to log into the communication clients 108a, 108b, 108c. Let it further be assumed that the communication clients 108a, 108b, 108c, 116 and the network element 112 implement SIP protocol and, as such, calls destined for and initiated by one of the communication clients 108a, 108b, 108c, 116 are addressed by using SIP URI or a portion thereof.

Step 510

The method for logging into a communication client begins at step 510, at which a registration request is received from a communication client (such as, for example, one of the communication clients 108a, 108b, 108c) by the network element 112. For the purposes of the example to be presented herein below, it shall be assumed that the user 101a uses the communication client 108a to provide the registration request.

In some embodiments of the present invention, the user 101a can enter the communication client into a registration mode. For example, the user 101a can enter a pre-determined sequence of soft keys, such as, for example, SERVICES→USER LOGIN. Alternatively, the communication client 108a may comprise a dedicated soft key for entering the communication client 108a into the registration mode. In yet further alternative embodiments of the present invention, the communication client 108a may comprise a dedicated log in button entering the communication client 108a into the registration mode.

The user 101a then inputs his or her user identifier, which in the example being presented herein, comprises a SIP URI (or a portion thereof). In the specific non-limiting embodiment of the present invention, the user 101a can input a portion of the SIP URI 4162223333@serviceprovider.com (ex. a numerical portion "4162223333", etc). The user 101a may be further required to enter a password associated with the user identifier. The user 101a may then click an ENTER soft key to confirm the entry. Responsive to the user 101a inputting the SIP URI and clicking the ENTER soft key, the communication client 108a generates a registration message, such as for example a SIP Registration message, substantially similar to the registration message 310 described above. The communication client 108a then transmits the registration message to the network element 112.

This is depicted in FIG. 1 as a signal flow labelled "RM1" and the registration message transmitted as part of step 510 is referred to herein below as a "registration message RM1". The transmission can be done in substantially the same manner as transmission of the registration messages 310, 312 described above.

It should be expressly understood that how the user 101a inputs his or her user identifier is not particularly limited. For example, in alternative non-limiting embodiments of the present invention, the user 101a can input the user identifier and/or optionally the password by presenting an RFID tag, a smart card, a fingerprint scan and the like to the communication client 108a. Naturally, within these alternative non-limiting embodiments of the present invention, the communication client 108a can be equipped with an appropriate reader (such as, an RFID reader, a smart card reader, a fingerprint scanner, etc). The appropriate reader can be integrated with the communication client 108a or can be coupled thereto via a connection.

Step 520

At step 520, the network element 112 determines if there exists another communication client registered in association with the same device group to which the communication client that has transmitted the registration message RM1 is registered to.

Firstly, the network element 112 determines an identifier associated with the communication client that originated the registration message RM1. In the specific example being presented herein, the network element 112 examines the registration message RM1 (or a packet encapsulating the registration message RM1) and determines an indication of the public IP address of the home gateway 110a and an indication of the port number of the home gateway 110a associated with the communication client that has originated the registration message RM1. The network element 112 then accesses the aforementioned device grouping 400 and performs a look up to determine if it contains a record that contains an address 404 and a sub-address 406 that match the so-received indications of the public IP address and the port number respectively.

In the specific non-limiting example under consideration here, the network element 112 determines that the record 400a comprises the address 404 and the sub-address 406 that match the so-determined public IP address and the port number. The network element 112 then examines the group identifier 408 of the record 400a and determines, based on the value stored therein, if the device grouping 400 contains any other record that contains the same group identifier 408 as the record 400a.

Step 525

If the network element 112 determines that the device grouping 400 does not contain such a record (i.e. the "NO" branch of step 520), the network element 112, at step 525, deduces that the communication client that originated the registration request RM1 is not associated with any device groups and can process the registration message RM1 according to standard registration request processing rules that would have applied in the absence of the feature contemplated herein. For example, the network element 112 may provision only the communication client that originated the registration message RM1 according to the registration message RM1.

Step 530

If, on the other hand, the network element 112 determines there does exist such a record (i.e. the "YES" branch of step 520), the network element 112 executes step 530. In the specific non-limiting example under consideration here, the network element 112 determines that records 400*b*, 400*c* contain the same group identifier 408 as the group identifier 408 of the record 400*a*. Accordingly, the network element 112 determines that the communication clients 108*b*, 108*c* associated with the records 400*b*, 400*c* belong to the same device group as the communication client 108*a* associated with the record 400*a*.

Then, at step 530, the network element 112 can cause the communication client that has originated the registration request message RM1 at step 510 (i.e. the communication client 108*a*), as well as other communication clients associated with the same device group (i.e. communication clients 108*b*, 108*c*) to be provisioned according to the registration message RM1. Within the specific non-limiting example under consideration herein, the network element 112 can generate the aforementioned records 200*a*, 200*b*, 200*c* of the client mapping 200 of FIG. 2A. Effectively, by executing the method described above, the user 101*a* has registered all three communication clients that have been associated with the "Group_1" by logging into one of the communication clients of the "Group_1".

Now, within some embodiments of the present invention, there may be a scenario where a second user can attempt to log into a given communication client associated with a given device group. For example, consider the following scenario. The user 101*a* may have executed the method described above and, as such, the user 101*a* is logged into the communication clients 108*a*, 108*b*, 108*c* and, as such, the records 200*a*, 200*b*, 200*c* of the client mapping 200 have been created. The user 101*b* may arrive at the customer premises 102 and may wish to initiate outgoing calls and receive incoming calls within the customer premises 102 using the SIP URI of the user 101*b*. By executing a method substantially similar to the method described with reference to FIG. 4, the user 101*b* can log into all communication clients associated, for example, with the device group "Group_1" by logging into one of the communication clients associated with the device group "Group_1".

Figure 2B:
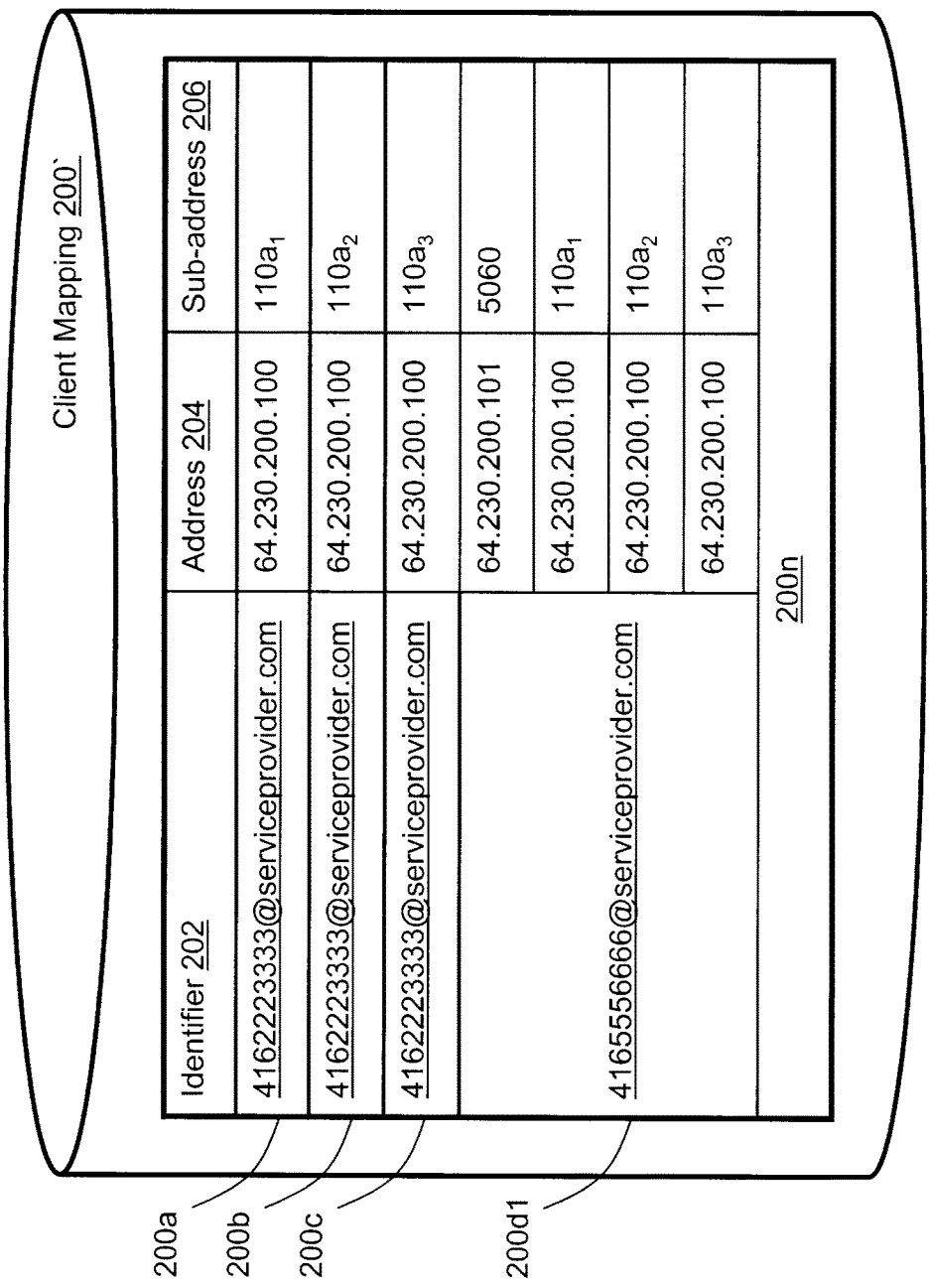
FIG. 2B is a diagram representing a non-limiting embodiment of a client mapping of FIG. 2A after execution of a method for logging into a communication client of FIG. 5.

Within this non-limiting scenario, as part of executing step 530, the network element 112 can generate a client mapping 200' of FIG. 2B. The client mapping 200' of FIG. 2B is just one non-limiting embodiment of a client mapping that can be generated by the network element 112 during the execution of step 530 within this non-limiting scenario. Within the non-limiting embodiment of FIG. 2B, the network element 112 can maintain the client mapping 200' on a "per-identifier 202" basis. In other words, the client mapping 200' maps all communication clients that are registered to a particular identifier 202 (ex. a particular SIP URI). Accordingly, as part of step 530, the network element 112 augments the record 200*d* of the client mapping 200 into a record 200*d*1 of the client mapping 200'. As depicted in FIG. 2B, the SIP URI associated with the user 101*b* is now associated with four communication clients, namely communication clients 108*a*, 108*b*, 108*c* and 116.

As one skilled in the art will appreciate, how the network element 112 implements step 530 within this non-limiting embodiment is not particularly limited and a number of alternatives are possible. For example, the network element 112 can update the client mapping 200 on a "per-communication client" basis. Within these non-limiting embodiments of the present invention, the client mapping 200 maps a given communication client to at least one SIP URIs to which the given communication client is registered to. Alternatively, the network element 112 can generate a separate record for each association between a given communication client and a given SIP URI in substantially the same way as depicted with reference to the client mapping 200 of FIG. 2A.

Within the non-limiting scenario under consideration here, by generating the client mapping 200' of FIG. 2B, the network element 112 has effectively turned the communication clients 108*a*, 108*b*, 108*c* into "multi-account communication clients" or, in other words, communication clients associated with more than one user account (ex. SIP URI, etc.). The creation of the record 200*d*1 can enable the following user experience:

Incoming call When an incoming call destined to SIP URI associated with the user 101*a* is received by the network element 112, the network element 112 causes the communication clients 108*a*, 108*b*, 108*c* to announce the incoming call, for example, by transmitting a signalling message to each of the communication clients 108*a*, 108*b*, 108*c* (such as, for example, a SIP Invite message or another suitable type of signalling message). When an incoming call destined to SIP URI associated with the user 101*b* is received by the network element 112, the network element 112 causes the communication client 116, as well as the communication clients 108*a*, 108*b*, 108*c* to announce the incoming call, for example, by transmitting a signalling message to each of the communication clients 116, 108*a*, 108*b*, 108*c* (such as, for example, a SIP Invite message or another suitable type of signalling message).

In some non-limiting embodiments of the present invention, some of the records within the client mapping 200' can be provisioned with a distinctive ringing trigger. For example, the distinctive ringing trigger can be provisioned on a per-SIP URI basis or on per-device basis. Within these embodiments of the present invention, the distinctive ringing flag can be operable to trigger the network element 112 to transmit a processing instruction to the communication clients 108*a*, 108*b*, 108*c* to cause the communication clients 108*a*, 108*b*, 108*c* to apply distinctive ringing when announcing an incoming call destined for the user 101*b* versus an incoming call destined for the user 101*a*.

Outgoing call When an outgoing call is initiated by one of the multi-account communication clients (ex. one of the communication clients 108*a*, 108*b*, 108*c*), the outgoing call can be handled in several possible non-limiting ways. Within a first non-limiting scenario, the network element 112 can cause some or all of the communication clients 108*b*, 108*b*, 108*c* to solicit a selection from a user (such as one of the users 101*a*, 101*b*) indicative of which of the two accounts the user is desirous of using. For example, the network element 112 can transmit a trigger to the communication clients 108*a*, 108*b*, 108*c* for causing the communication clients 108*a*, 108*b*, 108*c* to display two soft keys indicative of the two accounts.

According to another non-limiting scenario, a default identifier can be used for the outgoing call. For example, the SIP URI of one of the user 101*a* and 101*b* can be provisioned as default for the purposes of establishing the outgoing call (i.e. for the purposes of billing, CLID information, etc.). Within this scenario, the appropriate one of records 200*a*, 200*b*, 200*c* and 200*d*1 can be provided with a flag indicating that the information maintained in these records should be used as default for the purposes of outgoing calls originated by one of the communication clients 108*a*, 108*b*, 108*c*.

Within some non-limiting embodiments of the present invention, which are particularly applicable where the device grouping 400' of FIG. 4B is maintained, during execution of step 530, the network element 112 may determine that the communication client that has originated a registration message as part of step 510 is associated with more than one device group. For example, within a non-limiting scenario of the present invention where the user 101a may employ the communication client 108b to originate a registration message RM2 of FIG. 1, the network element 112 may determine that the communication client 108b is associated with two device groups—the device group "Group_1" and the device group "Group_2". The network element 112 may further determine that the communication client 108a associated with the record 400a belongs to the same device group as one of the device group to which the communication client 108b belongs (i.e. the "Group_1"). The network element 112 may further determine that the communication client 108c associated with the record 400c belongs to the same device group as one of the device group to which the communication client 108b belongs (i.e. the "Group_2").

In some embodiments of the present invention, the network element 112, while executing step 530, may provision both communication clients associated with the device group "Group_1" and communication clients associated with the device group "Group_2" according to the registration message RM2.

In an alternative non-limiting embodiment of the present invention, the network element 112 can solicit from the communication client 108b an indication of which one of the two device groups associated with the communication client 108b (i.e. the device groups "Group_1 and "Group_2") the user 101a is desirous of registering according to the registration message RM2. For example, the network element 112 can present an audio message, a text message or a combined audio/text message soliciting from the user 101a the indication of which one of the two device groups associated with the communication client 108b (i.e. the device groups "Group_1 and "Group_2") the user 101a is desirous of registering according to the registration message RM2. In an alternative non-limiting embodiment of the present invention, the audio, text or combination message may be presented to the user 101a via another suitable means (such as, for example, via a cell phone, via an instant messaging application, a pop-up window in a computing apparatus and the like). In an alternative non-limiting embodiment of the present invention, the network element 112 can present a list of communication client(s) of each of the two device groups.

In some non-limiting embodiments of the present invention, the user 101b may provide the indication of which one of the two device groups associated with the communication client 108b (i.e. the device groups "Group_1 and "Group_2") the user 101a is desirous of registering according to the registration message RM2 by, for example, producing a spoken utterance, by keying in a pre-determined sequence of keys, by clicking a pre-determined key, link or button. Naturally, the indication of which one of the two device groups associated with the communication client 108b (i.e. the device groups "Group_1 and "Group_2") the user 101a is desirous of registering according to the registration message RM2 may be provided by other means which will become apparent to those of skill in the art. In some non-limiting embodiments of the present invention, each of the device group (or each communication client within each of the device groups) can be associated with a so-called auxiliary identifier. The auxiliary identifier is meant to identify a particular device group (or a particular communication client within the particular device group) in a manner which is more amenable to be remembered by the user 101a. Some examples, of the auxiliary identifiers that can include, but are not limited to, "Home Group", "Work Group", "Home Line", "On the Go Group", "Cellular Phone", "Home Office Phone", "Bedroom Phone", "John Smith Group", "XYZ Inc. Visitor Group", "Reception Phone", "Main Boardroom Phone", etc. The indication of the auxiliary identifier can be stored, for example, within the client mapping 200, the device grouping 400, etc. The network element 112 then provisions the communication clients associated with a given one of the two device groups as per the indication provided by the user 101a.

Within some alternative non-limiting embodiments of the present invention, the group identifier 208 of the device grouping 400' can be further augmented with a device group rule. For example, the device group rule associated with a given device group can be indicative of a user identifier (ex. the SIP URI, etc.) for which the given device group should be used. How the device group rule is provisioned is not particularly limited. For example, the user 101a may provision the device group rule when provisioning the device group or at a later time. The user 101a may provision the device group rule, for example, using one of the communication clients 108a, 108b, 108c; by interacting with a customer services representative, accessing a web site or a web portal, completing and mailing an application form, etc. In some embodiments of the present invention, the owner of the communication clients registered in a particular device group may have sufficient administrative privileges to provision and/or amend the device group rules.

Figure 4C:
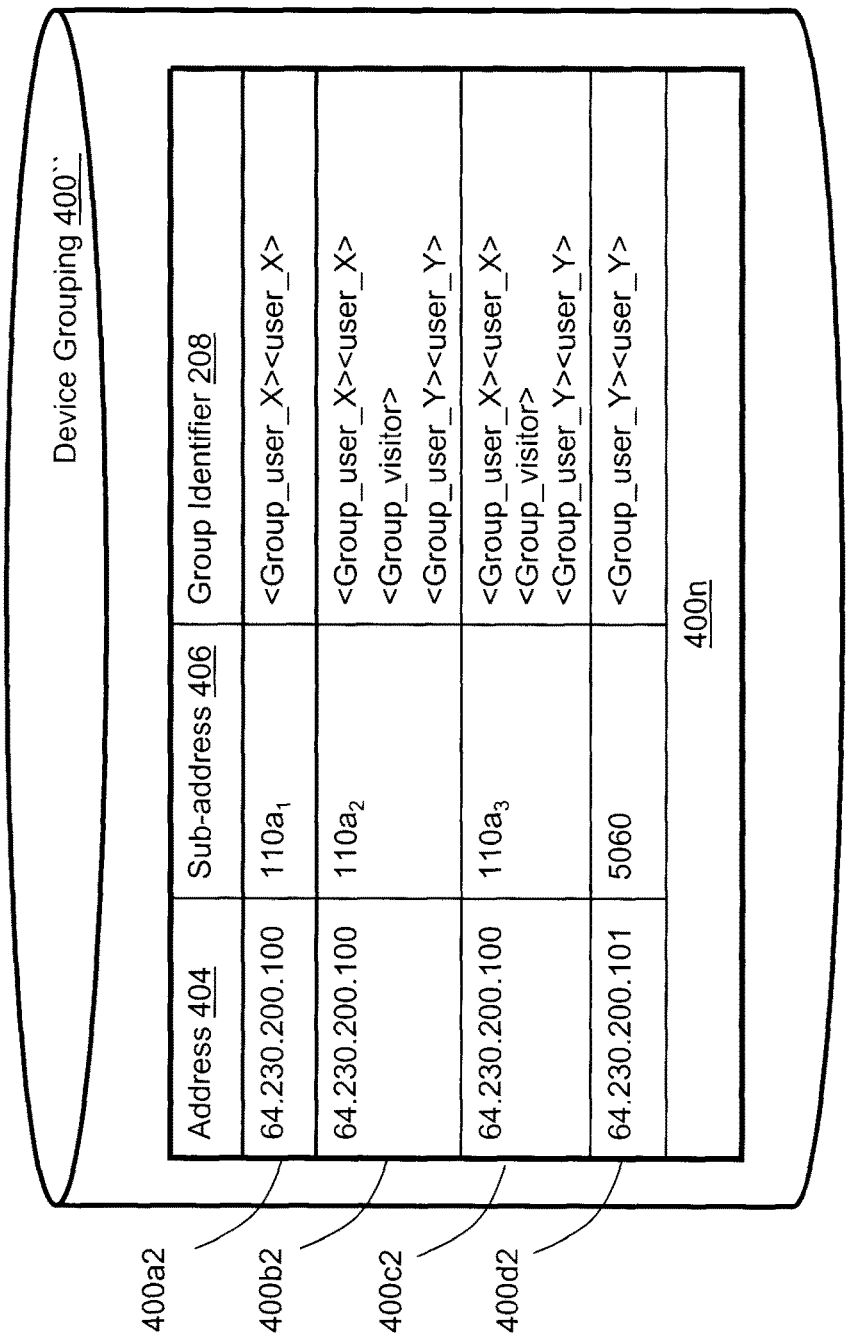

With reference to FIG. 4C, a non-limiting example of device group rules will be described in the context of a device grouping 400". The device grouping 400" is substantially similar to the device grouping 400 of FIG. 4A and, as such, like elements are depicted with like numerals. For example, an administrator (such as, one of the user 101a, 101b or another entity) may wish to provision three device groups. A first device group—a device group "Group_user_X", this device group including all three communication clients 108a, 108b, 108c. The administrator may provision a device group rule indicative of the device group "Group_user_X" to be applied only to registration messages that contain an identifier associated with a first user or user—X (for example, the SIP URI of the user 101a) received from one of the communication clients 108a, 108b, 108c. A device group "Group_user_Y" may include the communication clients 108b, 108c, 116 and may be applicable to those log ins when a user identifier associated with a second user or a user_Y (for example, the SIP URI of the user 101b) is used.

A device group "Group_Visitor" may include the communication clients 108b, 108c and may be indicative that users can be logged into the device group "Group_Visitor" irrespective of the user identifier which is used for the purposes of logging into the communication clients 108b, 108c.

Provisioning of such device group rules may be particularly applicable in a scenario where the first user and the second user reside at a given dwelling (such as, for example, the customer premises 102). The communication client 108a may be a personal phone associated with the first user and the communication client 116 may be a personal phone associated with the second user. The communication clients 108b, 108c may be "shared" phones and any visitors to the given dwelling may log into the shared phones.

Records 400a2, 400b2, 400c2 and 400d2 have been provisioned accordingly. Given that the above-described rules have been provisioned within the device grouping 400" and while executing various embodiments of the method described above, the following user experience is envisioned:

- If the user 101a logs into the communication client 108a, the user 101a will be logged into the communication clients 108a, 108b, 108c;
- If the user 101b logs into the communication client 108b, the user 101b will be logged into the communication clients 108b, 108c, 116;
- If another user logs into the communication client 108c, the other user will be logged into the communication clients 108b, 108c;
- If the user 101b attempts to log into the communication client 108a, the registration can either be rejected or, alternatively, the user 101b can be registered only to the communication client 108a.

It should be noted that a myriad of other alternatives are possible.

Naturally, the method of FIG. 5 can be adapted to un-register communication clients associated with a given device group if an un-registration request is received from one of the communication clients in the given device group. In an alternative non-limiting embodiment of the present invention, the registration provisioned in association with communication clients in a given device group may have an expiry indicator and the registration may expire, for example, after an hour, 8 hours, 1 week, 1 month or any other suitable duration of time. This period of time can be set by the user logging in or by an administrator. In an alternative non-limiting embodiment of the present invention, the administrator can affect the un-registration version of the method of FIG. 5 to un-register a given SIP URI from communication clients associated with a given device group.

It should be expressly understood that the method of FIG. 5 can be varied and a number of alternative non-limiting embodiments are envisioned. For example, execution of step 520 and 530 can be performed at different times. Within these non-limiting embodiments of the present invention, when a registration request is received as part of step 510 (i.e. at a "provisioning time") and as part of executing step 520, the network element 112 associates a user identifier (such as for example, the SIP URI of the user who originated the registration request, a device identifier associated with the communication client that has originated the registration request, etc.) and a device group identifier associated with a device group to which the communication client that originated the registration request belongs. This association can be stored in a mapping substantially similar to the device grouping 400, 400' or 400". In an alternative non-limiting embodiment of the present invention, this association can be stored in a modified version of the client mapping 200. For example, when a registration request is received from the communication client 108a, an indication of a device group associated with the communication client 108a can be added to the record 200a associated with the communication client 108a (for example, in a dedicated field or as part of the existing field). When an incoming call is received destined for the communication client 108a, the network element 112 can provision or sign in the communication client 108a, as well as other communication clients associated with the device group associated with the communication client 108a.

Step 530 is then executed at an "incoming call time" or, in other words, at a time when an incoming call is received by the network element 112, the incoming call being destined for the communication client that has originated the registration request in step 510. The network element 112 performs a look up to determine what other communication clients are registered in association with the device group and connects the incoming call to the communication clients associated with the device group.

In an alternative non-limiting embodiment of the present invention, the device group identifier may be embodied in a user identifier (such as for example, a SIP URI associated with a given user). Within these embodiments of the present invention, by executing the method described herein, a user can affect a group log in into communication clients that have been associated with the same user identifier (ex. the same SIP URI).

It should be expressly understood that teachings of this invention are not limited to the specific protocols used as illustrations above (ex. VoIP protocol, SIP, etc.) and one skilled in the art can easily adapt the teachings presented herein to other protocols, such as, for example, other protocols for handling voice-over-a-network communications.

Those skilled in the art will appreciate that certain functionality of the network element 112 and/or other elements of the infrastructure described herein may be implemented as pre-programmed hardware or firmware elements (e.g., application specific integrated circuits (ASICs), electrically erasable programmable read-only memories (EEPROMs), etc.), or other related components. In other embodiments, certain portions of the network element 112 and/or other elements may be implemented as an arithmetic and logic unit (ALU) having access to a code memory (not shown) which stores program instructions for the operation of the ALU. The program instructions could be stored on a medium which is fixed, tangible and readable directly by the network element 112 and/or other elements, (e.g., removable diskette, CD-ROM, ROM, fixed disk, USB drive), or the program instructions could be stored remotely but transmittable to the network element 112 and/or other elements via a modem or other interface device.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A method of logging a user into a plurality of Voice over Internet Protocol (VoIP) communication clients, the method implemented by a network element communicatively coupled to the plurality VoIP communication clients and comprising:

receiving at the network element a registration request from a first VoIP communication client of the plurality of VoIP communication clients, said registration request comprising an indication of a user's account;

determining, by the network element, a device group identifier of a device group with which said first VoIP communication client is associated;

determining, by the network element, whether there exists a second VoIP communication client associated with said device group identifier; and responsive to a determination by the network element, that the second VoIP communication client is associated with said device group identifier of the device group the first VoIP communication client that the registration request was received from was associated with, logging the user into said first VoIP communication client and said second VoIP communication client using the user's account received in the registration request from the first communication client thereby allowing the user to send and receive communications using both the first and second VoIP communication clients.

2. The method defined in claim 1, wherein said determining whether there exists a second VoIP communication client associated with said device group identifier comprises:
accessing a database comprising at least one record mapping a specific device group identifier with at least one corresponding VoIP communication client identifier associated with at least one VoIP communication client;
analyzing said database to determine if there exists said second VoIP communication client associated with said device group identifier.

3. The method defined in claim 1, wherein said determining whether there exists a second VoIP communication client associated with said device group identifier comprises:
accessing a database comprising at least one record mapping at least one VoIP communication client with at least one corresponding device group identifier;
analyzing said database to determine if there exists said second VoIP communication client associated with said device group identifier.

4. The method defined in claim 1, wherein said receiving a registration request comprises receiving a SIP Registration message from said first VoIP communication client.

5. The method defined in claim 1, further comprising generating a first record for associating said first VoIP communication client with said account and a second record for associating said second VoIP communication client with said account.

6. The method defined in claim 1, further comprising generating a record for associating said account with said first and second VoIP communication clients.

7. The method defined in claim 1, further comprising updating a first record associated with said first VoIP communication client with an association between said first VoIP communication client and said account and updating a second record associated with said second VoIP communication client with an association between said second VoIP communication client and said account.

8. The method defined in claim 1, further comprising updating a record associated with said account with an association between said account and said first and second VoIP communication clients.

9. The method defined in claim 1, wherein said account comprises a SIP URI.

10. The method defined in claim 1, further comprising retrieving at least one device group rule associated with said device group; and wherein said logging the user into said first VoIP communication client and said second VoIP communication client is executed at least in part based on said device group rule.

11. The method defined in claim 10, wherein said device group rule comprises at least one requesting party identifier for identifying at least one requesting party to which said device group is to be applied; and wherein the method further comprises determining whether an identifier of said first VoIP communication client corresponds to said at least one requesting party identifier; and wherein said logging the user into said first VoIP communication client and said second VoIP communication client is executed only if said identifier of said first VoIP communication client corresponds to said at least one requesting party identifier.

12. The method defined in claim 10, wherein said registration request comprises an indication of the user's account, and wherein said device group rule comprises an indication of at least one user account for identifying at least one requesting party to which said device group is to be applied; and wherein the method further comprises determining whether said user's account corresponds to said indication of at least one user account; and wherein said logging the user into said first VoIP communication client and said second VoIP communication client is executed only if said user's account corresponds to said indication of at least one user account.

13. A method of logging a user into a plurality of Voice over Internet Protocol (VoIP) communication clients, the method implemented by a network element communicatively coupled to the plurality VoIP communication clients and comprising:
receiving at the network element a registration request from a first VoIP communication client of the plurality of VoIP communication clients, said registration request comprising an indication of a user's account;
determining, by the network element, a first device group identifier of a first device group with which said first VoIP communication client is associated;
determining, by the network element, a second device group identifier of a second device group with which said first VoIP communication client is associated;
determining, by the network element, whether there exists a second VoIP communication client associated with said first device group identifier;
determining, by the network element, whether there exists a third VoIP communication client associated with said second device group identifier;
responsive to a determination, by the network element that (i) the second VoIP communication client is associated with said first device group identifier of the first device group the first VoIP communication client that the registration request was received from was associated with and (ii) third VoIP communication client is associated with said second device group identifier of the second device group the first VoIP communication client that the registration request was received from was associated with, soliciting, by the network element, from said first VoIP communication client an indication of which of said first and second device group identifiers is to be provisioned;
logging a user into said first VoIP communication client and said second VoIP communication client using the user's account received in the registration request from the first communication client responsive to said indication being indicative that said first device group identifier is to be provisioned to allow the user to establish communications using both the first and second communication clients; and
logging the user into said first VoIP communication client and said third VoIP communication client using the user's account received in the registration request from the first communication client responsive to said indication being indicative that said second device group identifier is to be provisioned to allow the user to establish communications using both the first and third communication clients.

14. A method of logging a user into a plurality of Voice over Internet Protocol (VoIP) communication clients, the method implemented by a network element communicatively coupled to the plurality VoIP communication clients and comprising:

receiving at the network element a registration request from a first VoIP communication client of the plurality of VoIP communication clients, said registration request comprising an indication of a user's account;

determining, by the network element, a device group identifier of a device group with which said first VoIP communication client is associated;

determining, by the network element, whether there exists a second VoIP communication client associated with said device group identifier; and responsive to a determination by the network element, that the second VoIP communication client is associated with said device group identifier of the device group the first VoIP communication client that the registration request was received from was associated with, soliciting from said first VoIP communication client an indication of which of said first VoIP communication client and said second VoIP communication client of said device group identifier is to be provisioned;

logging the user into said first VoIP communication client using the user's account received in the registration request from the first communication client responsive to said indication being indicative that said first communication client is to be provisioned, and logging the user into said second VoIP communication client using the user's account received in the registration request from the first communication client responsive to said indication being indicative that said second communication client is to be provisioned.

15. A system for logging a user into a plurality of Voice over Internet Protocol (VoIP) communication clients comprising:

a network element communicatively coupled to the plurality of VoIP clients, the network element configured for:

receiving at the network element a registration request from a first VoIP communication client of the plurality of VoIP communication clients, said registration request comprising an indication of a user's account;

determining, by the network element, a device group identifier of a device group with which said first VoIP communication client is associated;

determining, by the network element, whether there exists a second VoIP communication client associated with said device group identifier; and responsive to a determination by the network element, that the second VoIP communication client is associated with said device group identifier of the device group the first VoIP communication client that the registration request was received from was associated with, logging the user into said first VoIP communication client and said second VoIP communication client using the user's account received in the registration request from the first communication client thereby allowing the user to send and receive communications using both the first and second VoIP communication clients.

16. The system defined in claim 15, wherein to determine if there exists a second VoIP communication client associated with said device group identifier, the network element is configured for:

accessing a database comprising at least one record mapping a specific device group identifier with at least one corresponding VoIP communication client identifier associated with at least one VoIP communication client;

analyze said database to determine if there exists said second VoIP communication client associated with said device group identifier.

17. The system defined in claim 16, further comprising said database.

18. The system defined in claim 16, wherein the network element further comprises said database.

19. The system defined in claim 15, wherein to determine if there exists a second VoIP communication client associated with said device group identifier, the network element is configured for:

accessing a database comprising at least one record mapping at least one specific VoIP communication client with at least one corresponding device group identifier;

analyzing said database to determine if there exists said second VoIP communication client associated with said device group identifier.

20. The system defined in claim 19, further comprising said database.

21. The system defined in claim 19, wherein the network element further comprises said database.

22. The system defined in claim 15, wherein to receive a registration request, the network element is configured for receiving a SIP Registration message from said first VoIP communication client.

23. The system defined in claim 22, further comprising said first VoIP communication client; wherein said first VoIP communication client is configured for generating said SIP Registration message.

24. The system defined in claim 15, wherein the network element is further configured for generating a first record for associating said first VoIP communication client with said user account and a second record for associating said second VoIP communication client with said account.

25. The system defined in claim 15, wherein the network element is further configured for generating a record for associating said user account with said first and second VoIP communication clients.

26. The system defined in claim 15, wherein the network element is further configured for updating a first record associated with said first VoIP communication client with an association between said first VoIP communication client and said account and updating a second record associated with said second VoIP communication client with an association between said second VoIP communication client and said account.

27. The system defined in claim 15, wherein the network element is further configured for updating a record associated with said account with an association between said account and said first and second VoIP communication clients.

28. The system defined in claim 15, wherein said account comprises a SIP URI.

29. The system defined in claim 15, wherein the network element is further configured for retrieving at least one device group identifier rule associated with said device group identifier; and wherein the network element is configured for logging the user into said first VoIP communication client and said second VoIP communication client at least in part based on said device group identifier rule.

30. The system defined in claim 29, wherein said device group identifier rule comprises at least one requesting party identifier for identifying at least one requesting party to which said device group identifier is to be applied; and wherein the network element is further configured for determining whether an identifier of said first VoIP communication client corresponds to said at least one requesting party identifier; and wherein the network element is configured for logging the user into said first VoIP communication client and said second VoIP communication client only if said identifier of said first VoIP communication client corresponds to said at least one requesting party identifier.

31. The system defined in claim 29, wherein said registration request comprises an indication of the user's account, and wherein said device group rule comprises an indication of at least one user account for identifying at least one requesting party to which said device group is to be applied; and wherein the network element is further configured for determining whether said user's account corresponds to said indication of at least one user account; and wherein the network element is configured for logging the user into said first VoIP communication client and said second VoIP communication client only if said user's account corresponds to said indication of at least one user account.

32. A system for logging a user into a plurality of Voice over Internet Protocol (VoIP) communication clients comprising:
    a network element communicatively coupled to the plurality of VoIP clients, the network element configured for:
        receiving at the network element a registration request from a first VoIP communication client of the plurality of VoIP communication clients, said registration request comprising an indication of a user's account;
        determining, by the network element, a first device group identifier of a first device group with which said first VoIP communication client is associated;
        determining, by the network element, a second device group identifier of a second device group with which said first VoIP communication client is associated;
        determining, by the network element, whether there exists a second VoIP communication client associated with said first device group identifier;
        determining, by the network element, whether there exists a third VoIP communication client associated with said second device group identifier;
    responsive to a determination, by the network element that (i) the second VoIP communication client is associated with said first device group identifier of the first device group the first VoIP communication client that the registration request was received from was associated with and (ii) third VoIP communication client is associated with said second device group identifier of the second device group the first VoIP communication client that the registration request was received from was associated with, soliciting, by the network element, from said first VoIP communication client an indication of which of said first and second device group identifiers is to be provisioned;
    logging a user into said first VoIP communication client and said second VoIP communication client using the user's account received in the registration request from the first communication client responsive to said indication being indicative that said first device group identifier is to be provisioned to allow the user to establish communications using both the first and second communication clients; and
    logging the user into said first VoIP communication client and said third VoIP communication client using the user's account received in the registration request from the first communication client responsive to said indication being indicative that said second device group identifier is to be provisioned to allow the user to establish communications using both the first and third communication clients.

33. A system for logging a user into a plurality of Voice over Internet Protocol (VoIP) communication clients comprising:
    a network element communicatively coupled to the plurality of VoIP clients, the network element configured for:
        receiving at the network element a registration request from a first VoIP communication client of the plurality of VoIP communication clients, said registration request comprising an indication of a user's account;
        determining, by the network element, a device group identifier of a device group with which said first VoIP communication client is associated;
        determining, by the network element, whether there exists a second VoIP communication client associated with said device group identifier; and
        responsive to a determination by the network element, that the second VoIP communication client is associated with said device group identifier of the device group the first VoIP communication client that the registration request was received from was associated with, soliciting from said first VoIP communication client an indication of which of said first VoIP communication client and said second VoIP communication client of said device group identifier is to be provisioned;
        logging the user into said first communication client responsive to said indication being indicative that said first communication client is to be provisioned, and
        logging the user into said second communication client responsive to said indication being indicative that said second communication client is to be provisioned.

34. A non-transitory computer-readable storage medium comprising computer-readable program code which, when executed by a computing apparatus, causes the computing apparatus to perform a method of logging a user into a plurality of Voice over Internet Protocol (VoIP) communication clients, the method implemented by a network element communicatively coupled to the plurality VoIP communication clients and comprising:
    receiving at the network element a registration request from a first VoIP communication client of the plurality of VoIP communication clients, said registration request comprising an indication of a user's account;
    determining, by the network element, a device group identifier of a device group with which said first VoIP communication client is associated;
    determining, by the network element, whether there exists a second VoIP communication client associated with said device group identifier;
    responsive to a determination by the network element, that the second VoIP communication client is associated with said device group identifier of the device group the first VoIP communication client that the registration request was received from was associated with, logging the user into said first VoIP communication client and said second VoIP communication client using the user's account received in the registration request from the first communication client thereby allowing the user to send and receive communications using both the first and second VoIP communication clients.

\* \* \* \* \*